US007663769B2

(12) United States Patent
Hayashihara et al.

(10) Patent No.: US 7,663,769 B2
(45) Date of Patent: Feb. 16, 2010

(54) SHEET THICKNESS MEASURING DEVICE AND IMAGE FORMING APPARATUS

(75) Inventors: Hiromichi Hayashihara, Yokohama (JP); Masataka Shiratsuchi, Kawasaki (JP); Yoshinori Honguh, Yokohama (JP); Takeshi Morino, Tokyo (JP); Hiroshi Ohno, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/235,629

(22) Filed: Sep. 23, 2008

(65) Prior Publication Data

US 2009/0086217 A1 Apr. 2, 2009

(30) Foreign Application Priority Data

Sep. 27, 2007 (JP) ........................... P2007-252024
Mar. 31, 2008 (JP) ........................... P2008-093934

(51) Int. Cl.
*G01B 11/28* (2006.01)

(52) U.S. Cl. ................... 356/630; 356/632; 250/559.28

(58) Field of Classification Search ................. 356/630, 356/632; 250/559.27, 559.28
See application file for complete search history.

(56) References Cited

U.S. PATENT DOCUMENTS 4,676,646 A * 6/1987 Strand et al. ................ 356/632

FOREIGN PATENT DOCUMENTS

JP 2003-226447 8/2003
JP 2004-277057 10/2004
JP 2005-104723 4/2005

* cited by examiner

*Primary Examiner*—Roy Punnoose
(74) *Attorney, Agent, or Firm*—Turocy & Watson, LLP

(57) ABSTRACT

A sheet thickness measuring device includes: an illumination unit that outputs a light that is illuminated into a stack of sheets from a first area defined on one of faces including a top face, a bottom face, and side faces of the stack of sheets; a detection unit that detects a light amount distribution of light entered into the stack of sheets and propagated to a second area through the stack of sheets, the second area defined on one of the side faces of the stack of sheets; and a calculation unit that calculates a thickness of a sheet in the stack of sheets based on the light amount distribution detected by the detection unit.

24 Claims, 12 Drawing Sheets

| TYPE OF SHEETS | SHEET THICKNESS (μm) | GRAMMAGE (g/m²) | TARGET FIXING TEMPERATURE (°C) | SHEET CONVEYANCE SPEED (mm/s) |
|---|---|---|---|---|
| STANDARD PAPER 1 | A11~A12 | B11~B12 | C11~C12 | D1 |
| STANDARD PAPER 2 | A21~A22 | B21~B22 | C21~C22 | |
| HEAVY PAPER 1 | A31~A32 | B31~B32 | C31~C32 | D2 |
| HEAVY PAPER 2 | A41~A42 | B41~B42 | C41~C42 | |
| HEAVY PAPER 3 | A51~A52 | B51~B52 | C51~C52 | D3 |
| HEAVY PAPER 4 | A61~A62 | B61~B62 | C61~C62 | |

SHEET THICKNESS MEASURING DEVICE AND IMAGE FORMING APPARATUS

RELATED APPLICATION(S)

The present disclosure relates to the subject matters contained in Japanese Patent Application No. 2007-252024 filed on Sep. 27, 2007 and in Japanese Patent Application No. 2008-093934 filed on Mar. 31, 2008, which are incorporated herein by reference in its entirety.

FIELD

The present invention relates to a sheet thickness measuring device, an image forming apparatus, a method for measuring a sheet thickness, and a method for detecting a sheet type.

BACKGROUND

In a printer, such as a laser printer, which prints an image on a sheet including various types of sheets such as cardboard, copying sheet and OHP films, information on a thickness and type of the sheet is required for optimizing various conditions for printing and fusing processes. Conventionally, such information specifying a type of sheet subjected to the print out is manually input by a user. However, such manual input deteriorates convenience for the user. Accordingly, a technique is desired, which automatically determines a type of a sheet with high accuracy before starting to feed and convey the sheet for the print out.

A conventional device for optically measuring a sheet thickness in a state where the sheets are stacked on a tray in the printer, which will be referred to as an optical sheet thickness measuring device, will be described. The optical sheet thickness measuring device measures the thickness of the sheet in a state where two or more sheets are stacked on top of one another before the sheets are conveyed. An example of such device is disclosed in JP-A-2005-104723.

As a main configuration, the conventional optical sheet thickness measuring device stores the sheets in a state where two or more sheets are stacked and aligned on a tray and illuminates a side face of the stack of sheets by a light source from obliquely above or from obliquely below in order to emphasize irregularity at the side face of the stack of sheets. A light reflected from an area where directly illuminated by the light source is captured by a light receiving element, and a peak-to-peak distance is calculated from a wave pattern of the received light regarding brightness and darkness that are caused by the stacked sheets, thereby obtaining the thickness of the sheet. Since a light intensity of the reflected light is large at edges of the sheets and the light intensity of the reflected light is small at gaps between the sheets, there appears a lower peak at the gaps in light amount.

However, when only the light reflected by the directly illuminated area of the side face of the sheet stack is captured, it is difficult to obtain from the peak such contrast that is sufficient to find the accurate thicknesses of the respective sheets. And there is a possibility that a thickness of two or more sheets instead of single sheet is detected, causing it difficult to detect the accurate thickness of the sheet. Also, since the thickness of each individual sheet ranges from 60 μm to 300 μm, the thickness of two or more sheets may be erroneously detected as the thickness of thick sheet if the sheet thickness is reliably detected.

SUMMARY

According to a first aspect of the invention, there is provided a sheet thickness measuring device including: an illumination unit that outputs a light that is illuminated into a stack of sheets from a first area defined on one of faces including a top face, a bottom face, and side faces of the stack of sheets; a detection unit that detects a light amount distribution of light entered into the stack of sheets and propagated to a second area through the stack of sheets, the second area defined on one of the side faces of the stack of sheets; and a calculation unit that calculates a thickness of a sheet in the stack of sheets based on the light amount distribution detected by the detection unit.

According to a second aspect of the invention, there is provided an image forming apparatus including: the device according to the first aspect; an image forming section that forms an image on a sheet fed from the stack of sheets; and a control unit that controls the image forming section based on the thickness of the sheet calculated by the calculation unit of the device.

According to a third aspect of the invention, there is provided a sheet thickness measuring device including: an illumination unit that outputs a light that is illuminated on one of faces of a stack of sheets having a top face, a bottom face, and side faces; a detection unit that detects a light amount distribution of light reached to one of side faces of the stack of sheets, the side face being, different from the face where the illumination unit illuminates the light; and a calculation unit that calculates a thickness of a sheet in the stack of sheets based on the light amount distribution detected by the detection unit.

According to a fourth aspect of the invention, there is provided a sheet thickness measuring device including: an illumination unit that outputs a light that is illuminated on one of side faces of a stack of sheets having a top face, a bottom face, and the side faces; a detection unit that detects a light amount distribution of light reached to the side face on which the illumination unit illuminates the light; a light shield that prevents the light illuminated by the illumination unit from reaching the detection unit without entering into the stack of sheets; and a calculation unit that calculates a thickness of a sheet in the stack of sheets based on the light amount distribution detected by the detection unit.

DETAILED DESCRIPTION OF THE EMBODIMENTS

Figure 1:
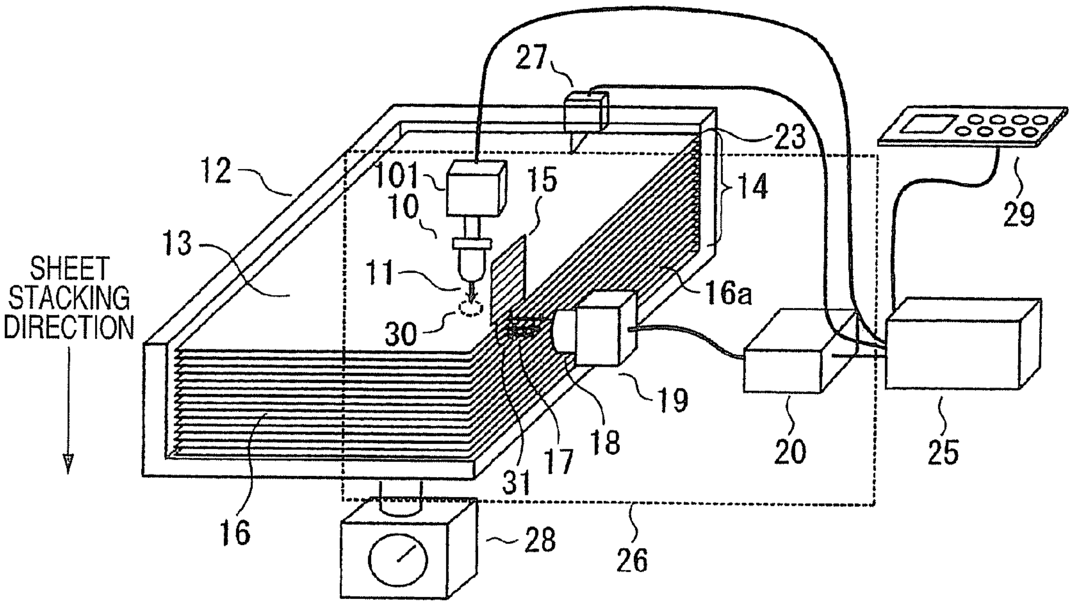
FIG. 1 is a view to show a configuration of a sheet thickness measuring device according to a first embodiment of the invention.

Embodiments of the present invention will be explained with reference to the accompanying drawings. In the following description, members and sections that are similar to or identical with one another are described and shown with same reference numerals, and cumulative description therefore will be omitted.

First Embodiment

Description will be given here of a first embodiment of the invention with reference to FIGS. 1 to 6 and FIG. 25.

FIG. 1 shows an example of a sheet type determining device, which is used to determine a type of sheet, extracted from an image forming apparatus for forming an image on sheet.

A sheet thickness measuring device 26 will be described herein. As shown in FIG. 1, two or more sheets 13 are stacked on top of one another to thereby form a sheet stack 14. The sheet stack 14 has a top face, a lower face and a plurality of side faces 16 that extend along a sheet stacking direction. The sheet stack 14 is put on a tray 12 including a mechanism (not shown) capable of moving up and down the sheet stack 14 in the sheet stacking direction. A light source 10 is provided above the sheet stack 14 and includes a light amount adjustment unit 101 for controlling illumination light amount. The light source 10 outputs illumination light 11 toward the top face of the sheet stack 14. Here, the top face means the top face of a sheet 13 that is stacked at uppermost in the sheet stack 14, whereas the lower face means the bottom face of the sheet 13 that is stacked at lowermost in the sheet stack 14.

The side face 16 means a plurality of side faces of the sheet stack 14 except for the upper and lower faces. The sheet stacking direction is a direction in which the sheets are stacked on top of one another, while a plurality of faces of the sheet stack 14 which are in parallel with the sheet stacking direction are regarded as the side faces of the sheet stack 14. A horizontal direction is a direction that is perpendicular to the sheet stacking direction. Of the plurality of side faces 16, one side face, to which a light receiving element 19 is opposed, is referred to as a side face 16*a*.

An area, which exists on the top face of the sheet stack 14 and onto which illumination light 11 is directly illuminated, is referred to as a first area 30. A propagated light 17 is measured by an image forming lens 18 and the light receiving element 19 which are respectively disposed to oppose the side face 16*a* of the sheet stack 14. The propagated light 17 is a light that is entered inside of the sheet stack 14 from a light source 10 and propagated inside of the sheet stack 14, and arrived at a second area 31 existing on the side face 16*a*. The light receiving element 19 is an area sensor having two-dimensionally arranged elements, such as a CCD image sensor and a CMOS image sensor. The image forming lens 18 and the light receiving element 19 can be moved in the sheet stacking direction and in the horizontal direction by an actuator unit (not shown).

The second area 31 of the side face 16*a* may be disposed on any one of the plurality of side faces 16 provided that the light receiving element 19 can measure the propagated light 17 that emits from the side face 16*a*; however, the second area 31 is the area that does not overlap with and is different from the first area 30 to be illuminated by the light source 10. According to the present embodiment, the first area 30 exists on the top face of the sheet stack 14 that is different from the side face where the second area 31 exists: that is, the present configuration satisfies the above definition.

A light shielding member 15 is made of a rectangular resin plate and is disposed in the following manner. That is, the light shielding member 15 is in contact with the top face of the sheet stack 14 at a position 1 mm inside from the side edge portion of the sheet stack 14 where the top face of the sheet stack 14 with the light being illuminated thereon by the light source 10 touches the side face 16*a*, thereby allowing the light receiving element 19 to see the propagated light 17. Also, the light shielding member 15 is configured such that it prevents other light than the propagated light 17, for example, the illumination light 11 to be issued from the light source 10 and the reflected light generated when the illumination light 11 is reflected by the first area 30 from entering directly the light receiving element 19. The light amount of the propagated light 17 in the second area 31 measured by the light receiving element 19 is output as light amount distribution information to a sheet thickness information obtaining unit 20. The sheet thickness information obtaining unit 20 calculates the thickness of the sheet 13 from the light amount distribution information.

There are disposed the above-mentioned sheet thickness measuring device 26, a total thickness measuring device 27 for measuring the total thickness of the sheet stack 14, a weight measuring device 28 for measuring the total weight of the sheet stack 14 and an area information obtaining device 29 for obtaining information on the area of the sheet 13; and, from several pieces of information on the sheet 13 and sheet stack 14 respectively output from these devices, the sheet type determining unit 25 calculates the grammage, which is the weight of the sheet 13 per square meter, of the sheet 13 and, from the calculated grammage, determines the kind of the sheet 13. The sheet type determining unit 25 retains a table that indicates correspondence between the grammage and a type of sheets. After then, conditions are output which are important when printing images on the sheet 13, for example, the temperature of a fuser which is used to form the images on the sheet 13. The foregoing description is of the sheet type determining device 26 which is incorporated in the image forming apparatus according to the invention and is used to determine the kind of the sheet 13.

Figure 2:
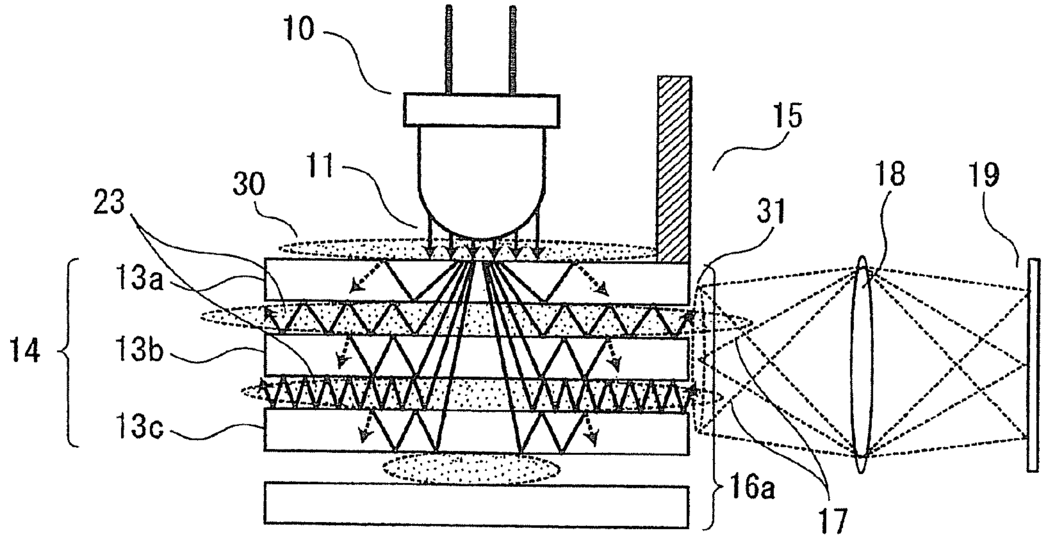
FIG. 2 is an explanatory drawing for explaining a transmission phenomenon of light when the light is allowed to permeate inside of a sheet stack.

FIG. 2 shows how the illumination light 11, which is illuminated from the light source 10 and is entered the sheet stack 14, is propagated through the inside of the sheet stack 14. As shown in FIG. 2, the illumination light 11 having entered the top face of the sheet stack 14 is diffusedly reflected by the surface of sheet 13*a* or permeates the inside of the sheet 13*a*, and a portion thereof is propagated through the sheet 13*a* and arrives at the surface of the sheet 13*b* that is situated below the sheet 13*a*. Here, since the attenuation rate of the light differs in sheet and in the air, the light is reflected repeatedly off gaps 23 between the sheet 13*a* and sheet 13*b* and arrives at the second area 31 which exists in the side face 16*a* of the sheet stack 14. The light arrived at the second area 31 emits outward from the second area 31 as the propagated light 17.

Therefore, when viewed at the side faces 16*a* of the sheet stack 14, the gaps 23 between the respective sheets 13 are viewed to be bright. Also, the end portion of the sheet 13 looks dark because the illumination light 11 is almost absorbed until it arrives at the side faces 16*a*. Accordingly, when the images of the second area 31 are captured by the light receiving element 19, the gaps 23 between the respective sheets 13 shine with a great light amount; and clear peaks appear in the light amount distribution information that is output by the light receiving element 19.

Although a portion of the illumination light 11 is reflected by the surface of the sheet 13, since the first area 30 and second area 31 respectively exist on different surfaces and also the light shielding member 15 is provided, little light is able to arrive at the light receiving element 19.

Now, description will be given here of the meaning of the fact that the first area 30 that is illuminated by the illumination light 11 output from the light source 10, and the second area 31, in which the light receiving element 19 measures the propagated light 17, are different areas which do not overlap each other. The light to be measured by the light receiving element 19 is the propagated light 17 that is entered the sheet stack 14 from the first area 30, propagated the gap 23 between the sheets, and arrived at the second area 31 existing on the side face 16 of the sheet stack 14. The light receiving element 19 does not measures the light reflected directly off the first area 30. In order that the first and second areas 30 and 31 do not overlap each other, according to the present embodiment, the first and second areas 30 and 31 respectively exist on the different surfaces of the sheet stack 14; and, in order to prevent the other light than the propagated light 17 from entering the light receiving element 19 there is disposed the light shielding member 15. Alternatively, however, the light shielding member 15 may not be used, provided that the light receiving element 19 and light source 10 are disposed so as to be able to prevent the other light than the propagated light 17 from entering the light receiving element 19.

Here, the above description means that a major portion of the second area 31 does not overlap with the first area 30. Therefore, even in a case where an edge portion of the second area 31 slightly overlaps with the first area 30 that is illuminated by the illumination light 11 output from the light source 10, since the main portion of the second area 31 does not overlap with the first area 30, it can be said that the first and second areas 30 and 31 are different from each other.

Figure 3:
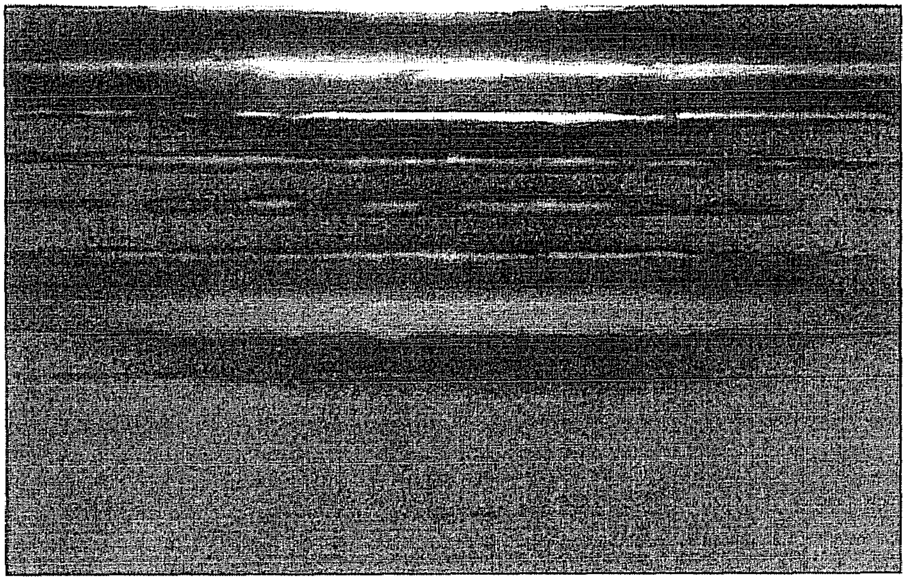
FIG. 3 is an example of the captured image of propagated light arrived at a second area defined at the side face of the sheet stack.

FIG. 3 shows an example of image data obtained by the sheet thickness measuring device 26 according to the present embodiment, specifically, the captured image data obtained when the light having arrived at the second area 31 is captured by the light receiving element 19. In the example shown in FIG. 3, the portion, which is shown in white and where the captured light amount is large, is a portion captured by light emit at the gap 23 of the sheets 13.

In the embodiment, the propagated light 17 is utilized, which is propagated between the gap 23 of the sheets 13 and not within the sheets 13. The light propagates within the sheets 13 will be attenuated and will not be largely emitted from the side face 16*a*. However, the light propagates between the gap 23 of the sheets 13 will not be largely attenuated and not be largely influenced by the irregularity at the side face 16*a* of the sheet stack 14. Therefore, by detecting the propagated light 17, a peak position that corresponds to each of side edges of the sheets 13 can be accurately measured from the white portion in the captured image data even in a case where the side face 16*a* of the sheet stack 14 is not evenly aligned and has irregularity by a cycle of several sheets 13. Accordingly, a thickness of each of the sheets 13 can be accurately determined by the configuration of the embodiment.

Figure 4:
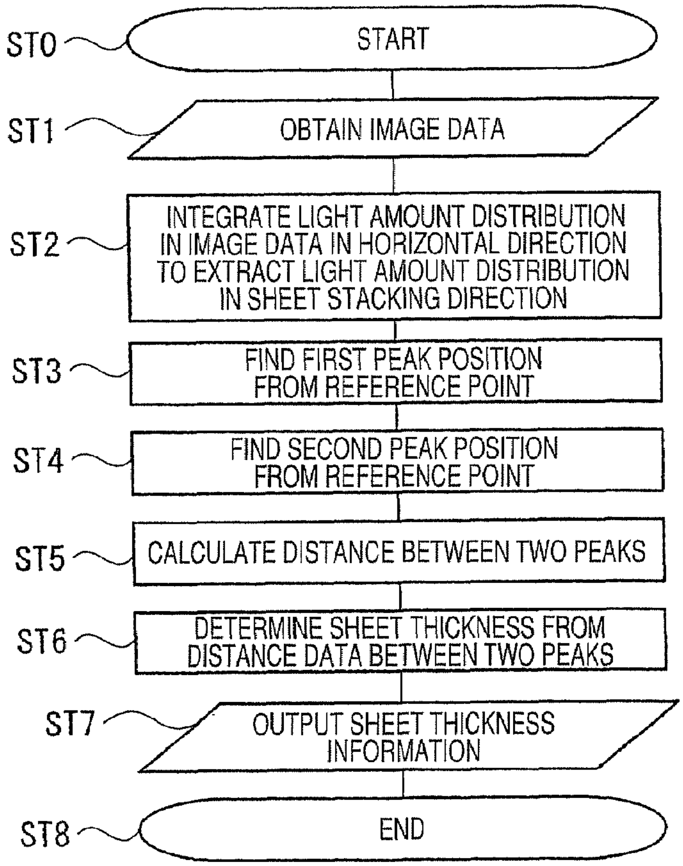
FIG. 4 is a flow chart of a processing procedure for obtaining the thickness of the sheet from the image data of the propagated light.

FIG. 4 is a flowchart of a processing procedure performed by the sheet thickness information obtaining unit 20 for calculating the thickness of the sheet 13 from the image data of the propagated light 17 that arrived at the second area 31.

The light amount distribution of the propagated light 17, which is arrived at the second area 31 after being entered from the light source 10 and propagated inside the sheet stack 14, is captured by the light receiving element 19, and the light receiving element 19 obtains image data as shown in FIG. 3 (ST1).

In the captured image data of the propagated light 17, there is generated light amount distribution in which brightness and darkness repeats along the sheet stacking direction. The interval of the repetition corresponds to the thickness of the sheet 13. The image data is divided into lines which respectively have a width of one pixel and extend along the sheet stacking direction. The light amount distribution in the respective pixels of the lines is integrated in the horizontal direction over the whole of the image data to thereby extract one dimension light amount distribution information along the sheet stacking direction in the second area 31 (ST2). From the wave patterns of the thus obtained light amount distribution information, a reference point is set, and the first peak position based on the reference point is found (ST3). Next, the second clearest peak position from the reference point is found (ST4). Next, the distance between these two peak positions are calculated (ST5), and the thickness of the sheet is determined from the distance information that indicates distance between the two peak positions (ST6). Sheet thickness information that indicates the thickness of the sheet 13 is thus obtained and being output (ST7), and the sheet thickness information obtaining processing is ended (ST8).

In the above-described process, there is employed the step (ST2) of integrating the light amount distribution in the horizontal direction. However, instead of integrating the light amount distribution, there may be extracted from the image data a line having the width of a pixel and extending along the sheet stacking direction, and there may be calculated the thickness of the sheet from the light amount distribution along the sheet stacking direction in the extracted line, thereby obtaining information on the sheet thickness. When the two dimension data is obtained, it is known experimentally that execution of the step (ST2) of integrating the light amount distribution in the horizontal direction can find more clearly the brightness and darkness cycle corresponding to the thickness of the sheet.

When integrating the light amount distribution in the horizontal direction (ST2), there may also be extracted an area in which the light and dark portions of the propagated light 17 along the sheet stacking direction appear clearly and the repeat interval thereof corresponds to the thickness of the sheet 13, and there may be executed an integration processing only in this area.

Also, the wave pattern of the light amount distribution along the sheet stacking direction calculated in the step (ST2) may be processed according to Fast Fourier Transformation (FFT) to extract the first peak position of power spectrum, and the thickness of the sheet may be calculated from the extracted peak position. By detecting the peak positions of the power spectrum, average value of the thickness of the sheet 13 can be accurately obtained without calculating every one of the sheets 13 from each of the peak positions.

Also, the thickness may also be calculated without executing actual calculation. That is, the light amount distribution information on the propagated light 17 in the sheet stacking direction obtained in the step (ST2) and the thickness of the then sheet may be previously stored in a database by the respective sheets having various thicknesses. When measuring the thickness of the sheet, the light amount distribution information obtained in the steps ST0~ST2 may be compared with the light amount distribution information stored in the database to thereby select therefrom the light amount distribution information which are similar to each other in the phase of the wave pattern of the light amount distribution information. Then, there may be called and output the thickness of the sheet that corresponds to the thus selected light amount distribution information.

When the light amount of the propagated light 17 is small, there can be obtained only a signal having low S/N, thereby being difficult to obtain a sufficient light amount to measure the thickness of the sheet 13. On the other hand, when the amount of light that propagates within the sheet 13 is too much, there is a possibility that the light receiving element 19 captures light other than the light propagated through the gaps 23 of the sheets 13, to thereby allow the mixing of noise, which makes it difficult to measure the thickness of the sheet with accuracy.

When a peak cannot be obtained from the light amount distribution information calculated by the above procedure and thus it is determined that the light amount distribution is not optimum, the light amount of the illumination light 11 from the light source 10 may be adjusted by a light amount adjustment unit 101, or the image forming lens 18 and light receiving element 19 may be moved using the actuator unit to adjust the measuring position, thereby being able to obtain proper light amount distribution.

Specifically, when it is determined that the light amount is too much, an actuator unit (not shown) may be moved in a direction to move away from the light source 10 on the side faces 16*a*, and when it is determined that the light amount is too small, the actuator unit may be moved in a direction to approach the light source 10, whereby there can be obtained a similar effect which can be obtained when the light amount of the light source 10 is adjusted. In the present embodiment, the actuator unit is mounted on the image forming lens 18 and light receiving element 19. However, when the position relationship of the image forming lens 18 and light receiving element 19 relative to the light source 10 can be changed, there can be obtained the effect of the present embodiment. Therefore, when the actuator unit is mounted on the light source 10, there can also be obtained a similar effect.

Alternatively, the light source 10 may be controlled to output light in a plurality of steps of light amount, and the propagated light 17 is captured for a plurality of times for each of the steps of light amount. The thickness of the sheets 13 may be calculated based on the image data that is captured with most appropriate light amount distribution.

In the embodiment, the light receiving element 19 measures the light amount of the second area 31 in the two dimension portion thereof, and the processing is executed based on the measured result. However, since there may be obtained a light amount at least along the sheet stacking direction, when the light receiving element 19 outputs the light amount distribution of a one dimension line along the sheet stacking direction, there may be omitted the step (ST2) of integrating the light amount distribution of the whole image data in the horizontal direction.

Figure 5:
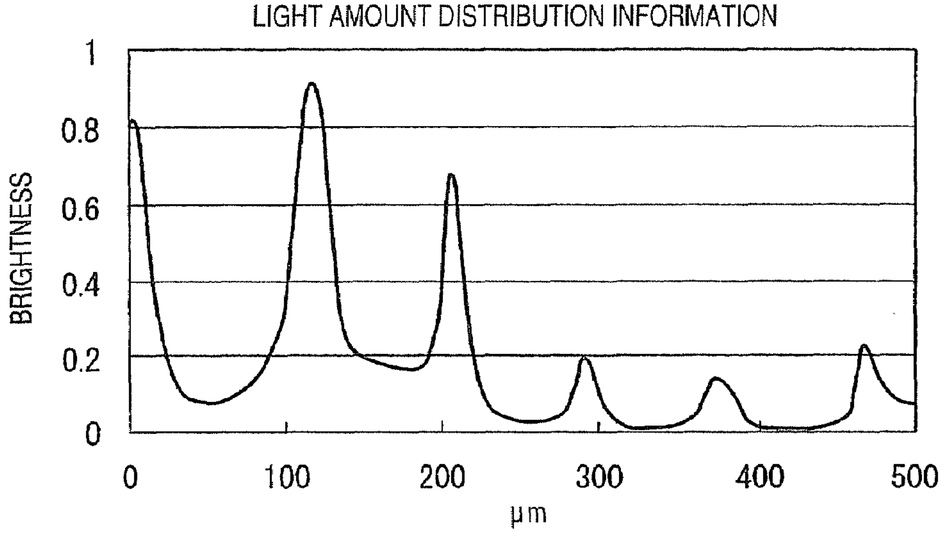
FIG. 5 is a graph showing a light amount distribution in the sheet stacking direction of the propagated light on the side face of the sheet stack obtained by integrating the image of FIG. 3 in the horizontal direction.

FIG. 5 shows light amount distribution in the sheet stacking direction, which is obtained using the present invention and also which contains the thickness information of the sheet obtained through the processing procedures of the steps (ST1) to (ST2) from the light amount distribution of the second area 31 obtained by the light receiving element 19; and, the light receiving element 19 is an area sensor in which elements are arranged in a two dimension manner. Here, the horizontal axis expresses the sheet stacking direction length of the side faces 16*a*, while the vertical axis expresses the standardized light amount of the propagated light 17. For example, suppose the first peak from the reference extracted from in the step (ST4) is a peak appearing in the 120 μm neighboring portion in FIG. 5, the second peak from the reference extracted from the step (ST3) provides a peak appearing in the 200 μm neighboring portion in FIG. 5. In the step (ST5), it is calculated that the distance between these two peaks is approximately 80 μm, whereby the thickness of the sheet is determined to be approximately 80 μm.

According to the above procedure, when the propagated light 17 in the second area 31 of the sheet stack 14 is viewed from the light receiving element 19, there can be obtained a peak which corresponds to a sheet, thereby being able to obtain the thickness of each sheet of the sheet 13.

Next, description will be given below in detail of a series of process in which, in an image forming apparatus according to the invention, a sheet type determining device determines the type of sheet based on the sheet thickness information obtained by the sheet type thickness device 26, and outputs print parameters necessary for forming images on the sheet 13, with reference to FIG. 6.

Figure 6:
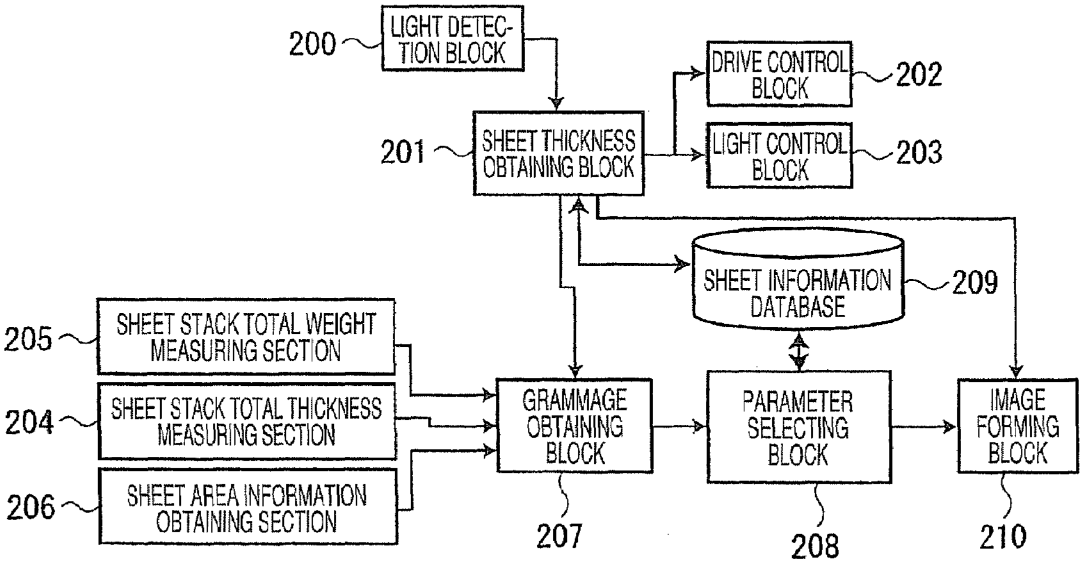
FIG. 6 is an explanatory view of function blocks employed in a sheet type determining device according to a first embodiment of the invention.

FIG. 6 shows the function block of an image forming apparatus including a processing procedure to be performed in the sheet type determining unit 25. The image data on the propagated light 17 having arrived at the second area 31 can be obtained by a light detection block 200 according to the above-mentioned method. The light detection block 200 serves as the light receiving element 19 and the image forming lens 18. The sheet thickness obtaining block 201 has a function to obtain the light amount distribution information of the propagated light 17 along the sheet stacking direction from the image data obtained by the light detection block 201 and also to detect the inter-peak interval of the light amount distribution indicated by the light amount distribution information to thereby obtain the thickness of the sheet from the distance between peaks.

The sheet thickness calculation block 201 also determines from the light amount of the propagated light 17 whether the intensity of the illumination light 11 from the light source 10 is optimum or not. When there cannot be obtained image data having the light amount distribution that can obtain the thickness of the sheet 13, the intensity of the illumination light 11 is adjusted by a drive control block 202 or a light control block 203. The drive control block 202 is mounted on the light detection block 200 and has a function to control the actuator unit that can be driven in the horizontal direction and in the sheet stacking direction. Also, the light control block 203 has a function to adjust the light amount of the illumination light 11 output from the light source 10.

According to the above-mentioned functions, the propagated light 17 having the optimum light amount distribution is captured, and the thickness of the sheet is calculated by the sheet thickness obtaining block 201. Various parameters corresponding to the thickness of the sheet 13 obtained by the sheet thickness obtaining block 201 are read out from a sheet information database 209 and are output to an image forming block 210.

A total thickness measuring section 204 measures the total thickness of the sheet stack 14. A total weight measuring section 205 measures the total weight of the sheet stack 14. An area information obtaining unit 206 obtains area information indicating an area of a printing face of the sheets 13.

The total thickness information of the sheet stack 14, the total weight information of the sheet stack 14, and the area information of the printing face of the sheets 13, which are output from the respective units, are input to a grammage obtaining block 207 to calculate a grammage of the sheet 13. The term "grammage" means the weight of the sheet 13 per square meter. In other words, the grammage can be obtained when the weight per sheet of the sheet 13 is divided by the area of the printing surface of the sheet. Specifically, when the total thickness of the sheet stack 14 is divided by the thickness of one sheet 13 to find the number of sheets of the sheet stack 14 and then the weight of one sheet is calculated from the total weight of the sheet stack 14 and the number of sheets of the sheet stack 14, there can be calculated the grammage.

A parameter selecting block 208 refers to the sheet information database 209 based on the grammage and the thickness of the sheets 13 and determines primary conditions for performing the printing, the primary conditions, such as the temperature and the like of a fuser for fusing ink to the sheet which are necessary to form an image on the sheet 13. The primary conditions are output to an image forming block 210.fuser In the sheet information database 209, contact pressure of conveyance rollers (not shown) that conveys the sheets 13 to an image forming section (not shown), optimum values for the parameters required for forming an image, such as a parameter for transferring bias for printing, are stored in association with the respective thicknesses and the grammages of the sheets 13.

Figures 24, 25:
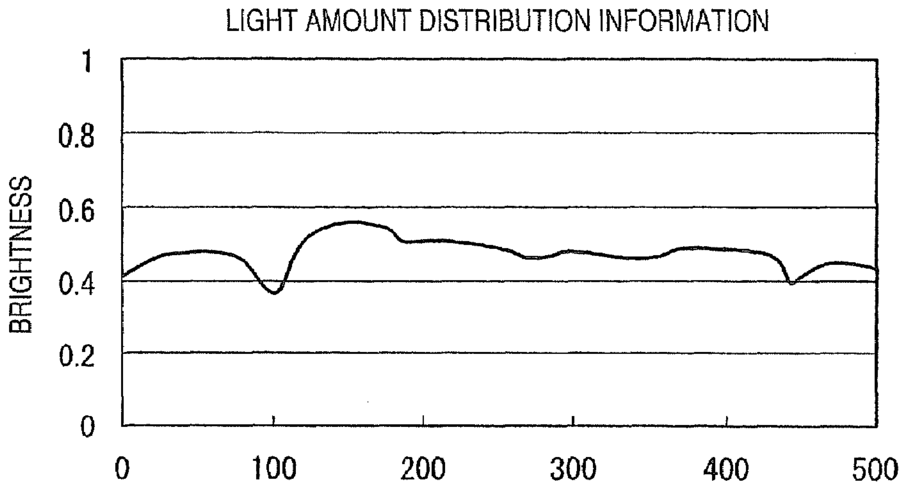
FIG. 24 is a graph showing a light amount distribution in a sheet stacking direction of a propagated light on the side face of a sheet stack obtained by integrating the image of the propagated light on the side face of the sheet stack captured according to a conventional technique.
FIG. 25 is an example of a table stored in a sheet information database.

FIG. 25 is a drawing showing an example of a look-up table that is stored in the sheet information database 209. As shown in FIG. 25, the look-up table stores information about a type of the sheets 13, target temperature of a fuser, sheet conveyance speed between an image transferring unit and the fuser, in association with the respective thicknesses and the grammages of the sheets 13.

The image forming block 210 controls units, such as the fuser (not shown), for performing the image formation (printing) on the sheets 13 based on the input information.

The sheet thickness obtaining block 201 obtains the contact pressure of the conveyance rollers in accordance with the thickness of the sheets 13 and outputs the contact pressure to the image forming block 210. The image forming block 210 operates in accordance with the contact pressure input from the sheet thickness obtaining block 201 to stably perform the conveyance of the sheets 13. The sheet thickness obtaining block 201 outputs the optimum value of the transfer bias to the image forming block 210. The image forming block 210 operates in accordance with the optimum value input from the sheet thickness obtaining block 201 to prevent bad transfer and retransfer, in which a transferred toner transfers back to the photoconductor drum, of a toner image.

A method for obtaining the area information of the printing face of the sheets 13 in the sheet stack 14 by the area information obtaining unit 206 will be described. One of such method is to input dimension information regarding the dimension of the sheets 13 (i.e. A4-size, and L-size), and to obtain the area information corresponding to the input dimension information. Another method is to attach a guide member that is provided to be movable on the tray 12 and guides the side faces 16 of the sheet stack 14. The area information of the sheets 13 may be calculated by the area information obtaining unit 206 based on the retaining position of the guide member, which is moved to abut the side faces 16 of the sheet stack 14 disposed on the tray 12. The area information may be calculated from the dimension information manually input or may be calculated by automatically measuring an area of the sheets 13.

According to the function blocks thus described, parameters that are appropriate for the printing may be set before performing a print job in accordance with the thickness and the grammage of the sheets 13.

When the illumination light 11 from the light source 10 or the other light than the propagated light 17, such as the reflected light in the first area 30, enters the light receiving element 19, a flare or the like occurs to thereby degrade the image data. When the illumination light 11 from the light source 10 enters the second area 31 where the light receiving element captures images, the side faces 16 are lit up brightly, thereby degrading the contrast of signals. Thus, between the light source 10 and light receiving element 19, there is interposed the light shielding member 15 which does not transmit the light.

The light shielding member 15 includes any member, provided that it can prevent the other light than the propagated light 17 from entering the light receiving element 19. For example, since an optical fiber transmits the light that satisfies the total reflection condition, it outputs only the light having a specific angle or less with respect to the center axis. Therefore, when the light receiving element 19 is disposed so as to exist outside this specific angle, the light can be prevented from entering the light receiving element 19 from the optical fiber. In such system configuration as well, the optical fiber falls under the above-defined light shielding member 15.

The light shielding member 15 is not limited to a rectangular light shield plate but, for example, it may also have such a cylindrical shape that surrounds the light source 10. When the light source 10 is surrounded by a light shield plate and is disposed such that the illumination light of the light source 10 is allowed to enter the sheet stack 14 in contact with the top face of the sheet stack 14, the other light than the propagated light 17 is prevented from entering the light receiving element 19, which can enhance the contrast of the signals.

The light shielding member 15 can be made of any material, provided it can attain the object to prevent the transmission of the light, for example, the light shielding member 15 can be made of resin, metal or rubber. Also, the light shielding member 15 may not be structured as a single member but may also be combined with the light source 10 as a unified body. Or, the light shielding member 15 and light receiving element 19 may be unified with each other.

The image forming lens 18 may be made of a refraction index distribution type lens or a cylindrical lens. By combining the light receiving element 19, which is configured by a sensor such as a line sensor or an area sensor, and the refraction index distribution type lens, an imaging distance between the light receiving element 19 and the side face 16*a* can be reduced, whereby the measuring device may be made more compact. When a line sensor and a cylindrical lens are combined together, the cylindrical lens gathers the horizontal direction light component of the sheet stack 14 to form images on the line sensor, thereby being able to widely obtain the propagated light 17 in the horizontal direction. That is, this combined configuration can provide a similar effect to the embodiment in which the area sensor is used as the light receiving element 19.

However, the above-mentioned examples are not limitative but there can also be used any other means, provided it can capture the image of the propagated light 17 from the side face 16*a* of the sheet stack 14.

The light shielding member 15 is disposed in contact with the sheet stack 14. In this case, specifically, the light shielding member 15 may press against the sheet stack 14 so as to compress the sheet stack 14, or may be caused to stop at a position where it is contacted with the sheet 13. That is, the light shielding member 15 is disposed such that it can be contacted with the sheet stack 14 with a proper pressing force according to the condition of the sheet stack 14. In this manner, provided that the light shielding member 15 can prevent the other light than the propagated light 17 from entering the light receiving element 19, the light shielding member 15 may be lightly contacted with the sheet stack 14, or may be contacted with the sheet stack 14 such that it presses against the sheet stack 14.

Although the position of the light shielding member 15, in the first embodiment, is set 1 mm inside from the end of the sheet 13, this is not limitative but, for example, the light shielding member 15 may also be set above the end of the sheet 13. At any rate, provided that the light shielding member 15 can fulfill its expected light shield function, it may be disposed at any position.

Also, the light shielding member 15 itself may include an actuator unit that adjusts a position of the light shielding member 15 to change a distance from an edge of the sheets 13. According to thus configuration, a light amount of the propagated light 17 that emits from the second area 31 can be adjusted.

The light receiving element 19, which measures the light amount distribution of the propagated light 17 in the second area 31 of the sheet stack 14, is not limited to an area sensor in which elements are arranged in two dimension manner, but it may also be a line sensor in which elements are arranged in one dimension manner.

When the light receiving element 19 is designed such that it can capture images while it is directly contacted with the side face 16*a* of the sheet stack 14, the image pickup system can be made more compact.

The light receiving element 19 may also be made of a photodiode, or an optical sensor array, or any other element, provided that it can measure at least the sheet stacking direction light amount distribution of the side faces 16*a*.

The illumination light 11 may be any one of red light rays, ultraviolet light rays, blue light rays, green light rays and near-infrared light rays. When there are used ultraviolet light rays having a wavelength of less than 380 nm or blue light rays having a wavelength of 380 nm to 500 nm, the attenuation ratio of the light in the inside of the sheet 13 is large, whereby the quantity of the light being propagated through the inside of the sheet is decreased, which makes it possible to see a signal having a higher contrast. When green light rays having a wavelength of 500 nm to 600 nm, or red light rays having a wavelength of 600 nm to 700 nm, or near-infrared light rays having a wavelength of 700 nm to 1100 nm are used, since the attenuation ratio of the light in the inside of the sheet 13 is small, the light permeates deeply into the sheet stack 14, thereby being able to obtain a signal indicating the light amount distribution of the propagated light 17 for a longer block.

Although, the total thickness measuring device 27 for measuring the total thickness of the sheet stack 14 is provided separately as shown in FIG. 1, the function to measure the total thickness of the sheet stack 14 may also be added to the light source 10 or light shielding member 15 which are structured so as to be pressed against the top face of the sheet stack 14.

In a state two or more sheets 13 are stacked on top of one another, in order to measure accurately the thicknesses of the sheets 13 one by one, it is necessary to detect the gaps 23 between the respective sheets 13 one by one.

FIG. 24 shows the sheet stacking direction light amount distribution information obtained in a conventionally well-known device in such a manner that a illumination light is illuminated onto the side face of a sheet stack by a light source disposed obliquely upward of the sheet stack, the light reflected by the side face of the sheet stack is measured, and the light and shade formed on the side face of the sheet stack due to the uneven portions of the sheet side face are integrated in the horizontal direction.

As shown in FIG. 24, when the illumination light is illuminated onto the side face of the sheet stack from obliquely upwardly and images are captured in such illuminated area, peaks appearing in a 2~4 sheets cycle possibly caused in a sheet cutting process stand out more than the frequency component of the illumination light calculated in each individual sheet. Owing to this, a peak appearing in an each individual sheet cycle is very weak, whereby only a signal having a non-favorable S/N ratio can be obtained.

Figure 7:
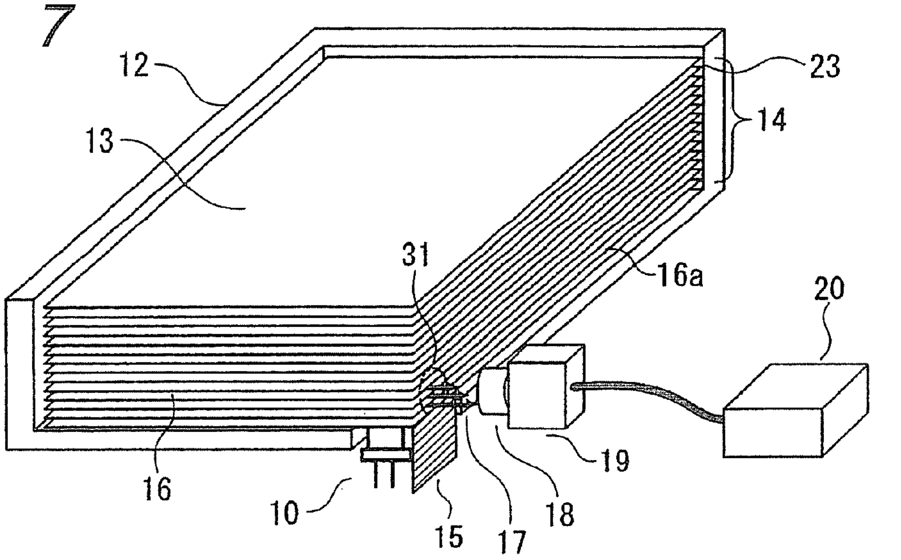
FIG. 7 is a view of another configuration of a sheet thickness measuring device according to the first embodiment of the invention.

FIG. 7 shows another configuration of the sheet thickness measuring device according to the first embodiment of the invention. In FIG. 7, the sheet stack 14 is put on the tray 12 and the lower face of the sheet stack 14 is illuminated by the illumination light 11 output from the light source 10 which is disposed downwardly of the sheet stack 14. The image forming lens 18 and light receiving element 19 are respectively disposed opposed to the side face 16*a* of the sheet stack 14. The light source 10 applies the illumination light 11 into the inside of the sheet stack 14, the illumination light 11 is propagated through the inside of the sheet stack 14, and the light amount distribution of the propagated light in the second area 31 of the side face 16*a* of the sheet stack 14 is measured by the light receiving element 19. Here, the lower face of the sheet stack 14 is a face that serves the print surface and disposed to face the bottom of the tray 12. In this case, since the light source 10 and light shielding member 15 can be disposed on the bottom of the tray 12, the configuration can be made compact.

Also, even when the light source 10 is disposed on the two or more side faces 16 of the sheet stack 14 to which the light receiving element 19 is not disposed opposed, there can also be obtained the advantages of the invention, provided that the propagated light 17 can be measured.

Alternatively, although not shown, the light source 10 may be disposed in the two portions of the sheet stack 14, that is, on the upper and lower faces thereof, the two light sources 10 may be operated simultaneously or alternately to apply their illumination lights to the inside of the sheet stack 14, and the sheet thicknesses of the upper and lower portions of the sheet stack 14 may be measured by the light receiving element 19 disposed on the side face 16*a* of the sheet stack 14.

Also, when the surface, to which the two light sources 10 are disposed opposed and which includes the first area, is different from the side face 16*a* to which the light receiving element 19 is disposed opposed and which includes the second area, there can be provided the advantages of the invention.

By the way, the sheet thickness measuring device 26 and sheet type determining device according to the invention can be used as means for obtaining the information of the sheet 13 not only in MFP (Multiple Function Peripheral) devices and a laser printer but also in a printer such as a bubble jet (R) printer or an ink jet printer.

Second Embodiment

Figure 8:
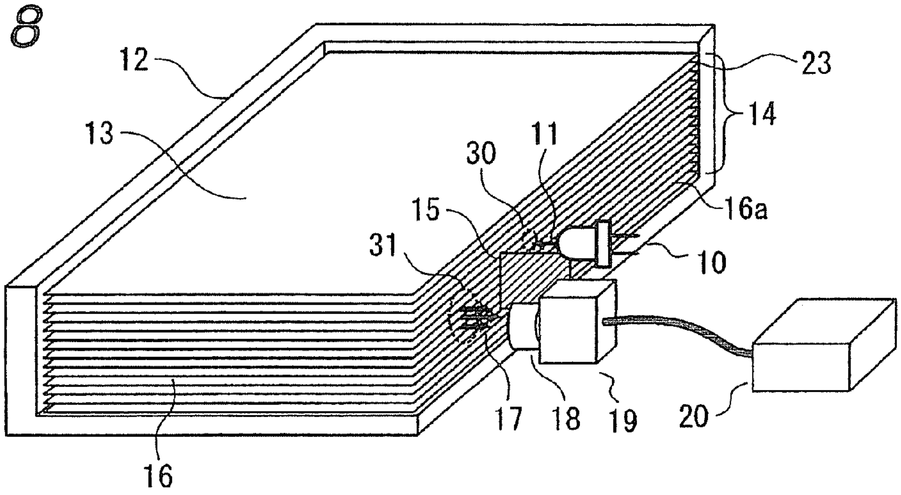
FIG. 8 is a view of a configuration of a sheet thickness measuring device according to a second embodiment of the invention.
Figure 9:
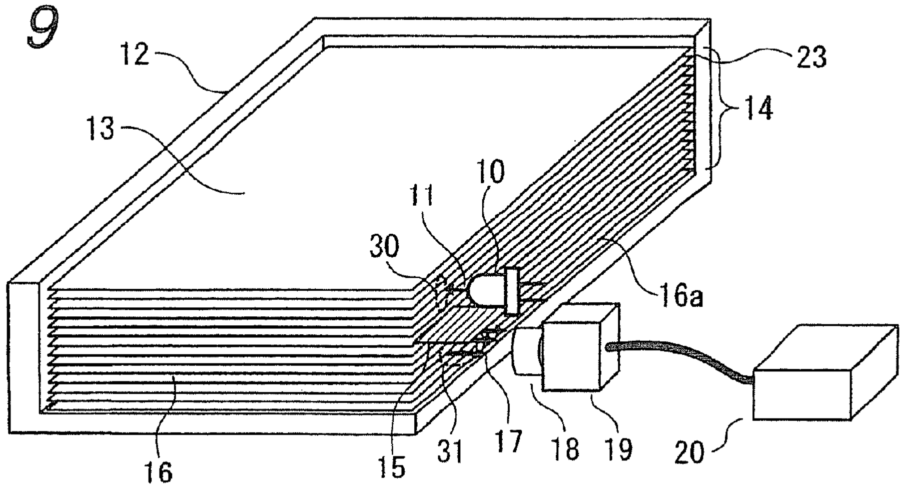
FIG. 9 is a view of another configuration of a sheet thickness measuring device according to the second embodiment of the invention.

Next, description will be given below of a second embodiment according to the invention with reference to FIGS. 8 and 9. FIGS. 8 and 9 are respectively configuration views of a sheet thickness measuring device according to the second embodiment.

In FIG. 8, the light source 10 applies the illumination light 11 toward the side face 16*a* of the sheet stack 14 on the side of which the light measuring section 19 is disposed. The area of the side face 16*a*, to which the illumination light 11 is applied, is the first area 30. The illumination light 11, which is illuminated toward the first area 30 existing in the side face 16*a*, permeates the inside of the sheet stack 14, is diffusedly propagated through the gaps 23 of the respective sheets constituting the sheet stack 14, and arrives at the second area 31 existing in the side face 16*a*. The propagated light 17, which is output from the second area 31, is gathered onto the light receiving element 19 through the image forming lens 18 disposed to face the second area 31, thereby being able to obtain image data.

The light shielding member 15 is interposed between the first and second areas 30 and 31 in contact with the side face 16*a* of the sheet stack 14 and is used to shield not only the light that enters the light receiving element 19 directly from the light source 10 but also the light that is reflected directly off the first area 30. That is, the first area 30 to be illuminated by the light source 10 and the second area 31, where the image forming lens 18 and light receiving element 19 capture images, are formed as separate areas which do not overlap with each other, thereby allowing the light receiving element 19 to measure the propagated light 17.

Here, when the light shielding member 15 is configured so as to have a soft material such as rubber in the end portion thereof, the soft material portion of the light shielding member 15 can be deformed according to the uneven portions existing on the side face 16*a* of the sheet stack 14 to shield the light, thereby being able to reduce the noise that can be generated by the light leaked from a gap between the sheet stack 14 and the light shielding member 15.

Next, description will be given below of the advantages of the second embodiment according to the invention. In the second embodiment, the illumination light 11 is illuminated onto the side faces 16*a* of the sheet stack 14 and is diffusedly propagated through the inside of the sheet stack 14, so that the light the arrives at the side face 16*a* as a propagated light 17; and, the propagated light 17 is then captured by the light receiving element 19 for capturing the image of the same side face 16*a*. Owing to this, the light source 10, light shielding member 15 and light receiving element 19 can be disposed on the same side face 16*a* of the sheet stack 14, thereby being able to provide a space saving configuration.

Now, FIG. 9 shows another configuration of the sheet thickness measuring device according to the second embodiment of the invention. In FIG. 9, the light shielding member 15 and the light receiving element 19 serving as optical quantity distribution detecting means, both of which exist on the side face 16*a*, are arranged in the sheet stacking direction of the sheet stack 14. This configuration is characterized in that it can reduce the leakage of the light from the light shielding member 15 caused by the uneven portions of the sheet stack 14 generated on the side face 16*a* of the sheet stack 14 by the sheets 13.

Third Embodiment

A third embodiment according to the present invention will be described with reference to FIGS. 10 and 11.

Figure 10:
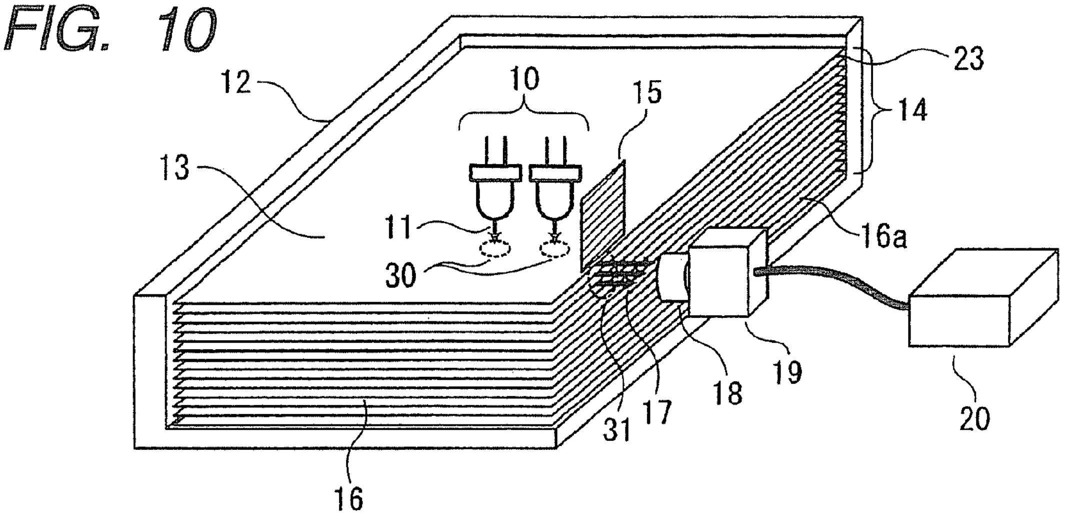
FIG. 10 is a view of a configuration of a sheet thickness measuring device according to a third embodiment of the invention.

FIG. 10 shows a configuration of a sheet thickness measuring device according to a third embodiment of the invention.

According to the third embodiment shown in FIG. 10, two light sources 10 are disposed opposed to the top face of the sheet stack 14 in such a manner that their respective distances from the end side of the top face of the sheet stack 14 are different from each other. Each light source 10 includes a control mechanism (not shown) which can control the light amount of the illumination light 11 in order that the propagated light 17 output from the second area 31 on the side face 16*a* can provide the optimum light amount, whereby the respective illumination light quantities can be changed, or the respective illumination lights can be emitted simultaneously or alternately.

The light shielding member 15 is disposed in contact with the top face of the sheet stack 14 so as to be able to prevent the other light than the propagated light 17 from entering the light receiving element 19. The first area 30 to be illuminated by the light source 10 and the second area 31 to be image captured by the light receiving element 19 do not overlap with each other.

The illumination light 11, which is illuminated onto the top face of the sheet stack 14, permeates the inside of the sheet stack 14, is diffusedly propagated through the gaps 23 between the respective sheets 13 constituting the sheet stack 14, and arrives at the side face 16*a* of the sheet stack 14. The propagated light 17 is then gathered from the side face 16*a* of the sheet stack 14 through the image forming lens 18 disposed opposed to the side face 16*a* onto the light receiving element 19 made of an area sensor in which elements such as CCD image sensors or CMOS image sensors are arranged in a two dimension manner. The image forming lens 18 and light receiving element 19 can be moved in the horizontal direction as well as in the sheet stacking direction by an actuator unit (not shown).

In the present invention, because the measurement is performed using a light that is propagated between the gap 23 of the sheets 13, it is preferable to adjust the positions of the light source 10 and the light receiving elements 19 in accordance with the thickness and density of the sheets 13. Depending on the difference between the illuminated positions of the light source 10, there is generated a difference in the light amount of the propagated light 17. For example, suppose that, when the light source 10 disposed at a position 1.5 mm from the end of the sheet stack 14 is driven to emit the illumination light, the light amount of the propagated light 17 is much; however, when the light source 10 disposed at a position 3 mm from the end of the sheet stack 14 is driven to emit the illumination light, the light attenuates greatly by an amount equivalent to the long distance from the end of the sheet stack 14, and thus the light amount of the propagated light 17 decreases, which makes it possible to detect a peak from the gaps 23 of the respective sheets using the propagated light 17. The position from the end of the sheet stack 14 may be adjusted according to the actual enforcement. The light emission from the light source 10 may be performed one by one and, when the light amount is short in such one-by-one light emission, by allowing two or more light sources 10 to emit their respective lights simultaneously, the light amount can be compensated.

Also, when the thickness of the sheet 13 is large, the illumination light 11, which is entered the top face of the sheet stack 14, is absorbed when it propagates through the inside of the sheet 13, so that the light amount of the propagated light 17 that outputs from the second area 31 on the side face 16*a* decreases. Accordingly, there is a possibility that there cannot be obtained a light amount adequate to measure the thickness of the sheet 13.

On the other hand, when the thickness of the sheet 13 is small, the illumination light 11 having entered the top face of the sheet stack 14 is difficult to be absorbed when it propagates through the inside of the sheet 13, so that the amount of light that passes inside the sheets 13 increases. In this case, the light receiving element 19 captures the image of the other light as well than the light propagated through the gaps 23 between the respective sheets 13, and thus noise is generated, which can make it impossible to measure the thickness of the sheet 13.

The easiness of the light to pass inside the sheets 13 also changes due to the material and density of the sheets 13.

Accordingly, in a case where the light amount of the propagated light 17 is small, sufficient light amount of the propagated light 17 can be obtained by adjusting the position where the light receiving element 19 measures by the actuator (not shown) in a horizontal direction, thereby to measure the propagated light 17 that is output from the second area 31 where the light source 10 is disposed near to an edge of the sheet stack 14. In a case where the light amount of the propagated light 17 is too large, the position should be adjusted to measure the propagated light 17 that is output from the second area 31 where the light source 10 is disposed far from the edge of the sheet stack 14.

From the foregoing description, by horizontally adjusting the image pickup position in the side face 16*a* of the sheet stack 14 using the actuator unit (not shown), there can be formed a mechanism which is capable of capturing an image at the optimum light amount position according to the thickness of the sheet stack 13. Using this mechanism, in the second area of the side face 16*a*, there can be extracted an area where the light amount of the propagated light 17 to be measured by the light receiving element 19 becomes proper, thereby being able to obtain a signal of the light amount distribution having a high contrast. Alternatively, by measuring the attenuation ratio of the sheet stack 14 from the light amount distribution information, the density of the sheet 13 may also be calculated. Also, the installation position of the light source 10 is not limited to the top face 14 of the sheet stack 14, but the light source 10 may also be disposed on the side face 16 or the bottom face of the sheet stack 14.

After the measured light amount is determined to be optimum, when the image data captured by the light receiving element 19 are processed through the procedure discussed in the first embodiment, there can be obtained information about the thickness of the sheet 13.

Of the two light sources 10, the light source 10 existing distant from the end of the sheet 13 may be made of an LED for emitting a red light, whereas the light source 10 existing near to the end of the sheet 13 may be made of an LED for emitting a blue light. Since the light attenuation of the blue light in the inside of the sheet 13 is large and thus the blue light is easy to attenuate in the inside of the sheet 13, the propagated light 17 that is propagated through the inside of the sheet 13 becomes small, thereby being able to obtain a signal having a sufficient light amount distribution to measure the thickness of the sheet 13; but, because the blue light can permeate only up to the small-depth portion of the sheet stack 14, there is a possibility that the second area 31 capable of capturing images can be narrowed.

On the other hand, the red light in the inside of the sheet 13 is less attenuated and thus can permeate up to the deep portion; however, even in the inside of the sheet 13, the red light is difficult to attenuate, and thus the propagated light 17 output from the second area 31 is easy to contain not only the light propagated through the gaps 23 but also the light propagated through the inside of the sheet 13, thereby raising a possibility that there cannot be obtained a signal to obtain a sufficient light amount to measure the thickness of the sheet 13. When the two light sources 10 are respectively controlled to thereby adjust their respective light quantities while making use of the characteristics of the two different light emission center wavelengths, it is possible to control the propagated light 17 output from the second area 31 according to the sheet to be measured, so that there can be obtained a signal of the light amount distribution having a high contrast. Also, the manner of combination is not limited to the combination in which the light source 10 existing distant from the end of the sheet stack 14 is made of a red color LED and the light source 10 existing near to the end of the sheet stack 14 is made of a blue color LED, but any manner of combination may be used, provided that there can be obtained a signal of the light amount distribution having a high contrast.

Two LEDs at the same distance from the end of the sheet stack 14 may be arranged, and the lights to be emitted from the two LEDs may respectively be a blue light and a red light. The light amount of the propagated light 17 that is output from the second area 31 is different in cases where the illumination light 11 is the blue light or the red light due to the transmittance inside the sheets 13 are different. By utilizing the difference in the transmittance due to the difference in wave length, the light amount of the illumination light 11 that is output by each LEDs may be respectively controlled in order to measure the propagated light 17 appropriately. Also, the number of LEDs is not limited to two but it may also be three or more. The light source 10 is not limited to be configured by LEDs by may be configured by other light sources, such as lasers.

Figure 11:
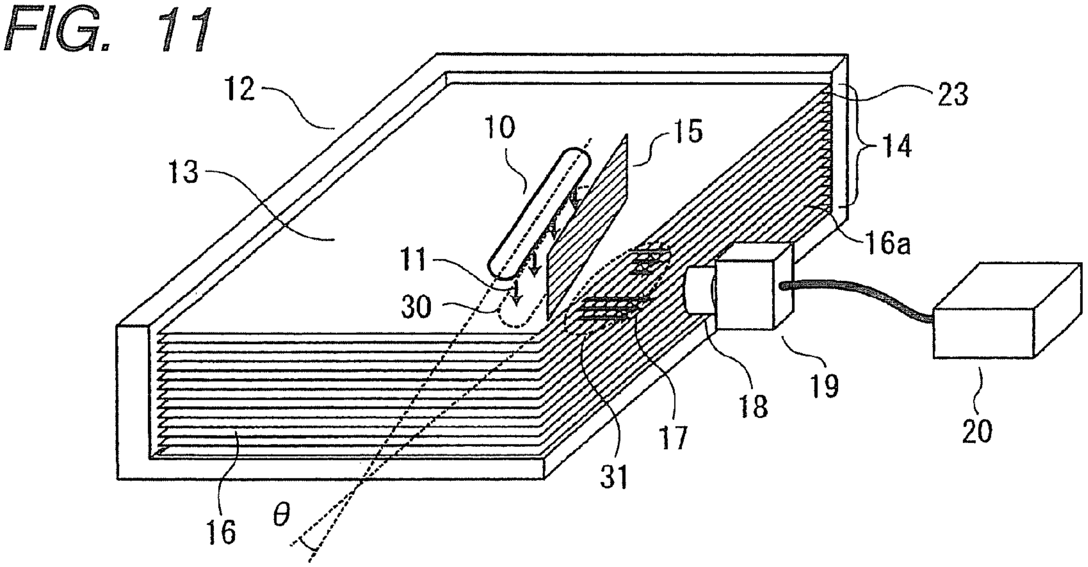
FIG. 11 is a view of another configuration of a sheet thickness measuring device according to the third embodiment of the invention.

FIG. 11 shows another configuration of the sheet thickness measuring device according to the third embodiment of the invention.

In FIG. 11, there is disposed a light source 10 having a line-shaped radiation surface such as a slender fluorescent tube in such a manner that it has an angle of θ with the end of the sheet stack 14. When the light source 10 having a line-shaped radiation surface exists near to the side of the sheet stack 14, where the side face 16*a* of the sheet stack 14 containing therein the second area 31 and the top face of the sheet stack 14 containing therein the first area 30 meet each other, the propagated light 17 from the side faces 16 of the sheet stack 14 has a large quantity of light; on the other hand, as the light source 10 becomes distant from such side of the sheet stack 14, the light amount of the propagated light 17 decreases.

When it is determined that the image data obtained by the light receiving element 19 are not optimum to obtain information on the thickness of the sheet 13, the positions of the light receiving element 19 and image forming lens 18 may be moved in the horizontal direction, thereby being able to adjust the light amount of the propagated light 17 to be measured.

From the foregoing description, according to the embodiment shown in FIG. 11, only by using the linear light source 10 having a simple configuration and also by adjusting the image pickup position in the side face 16*a* of the sheet stack 14 in the horizontal direction, there can be provided a mechanism which is capable of obtaining an optimum light amount.

Also, although the light source 10 is disposed on the top face of the sheet stack 14, it may also be disposed on the side face or the bottom face of the sheet stack 14.

Fourth Embodiment

A fourth embodiment of the present invention will be described below with reference to FIGS. 12 and 13.

Figure 12:
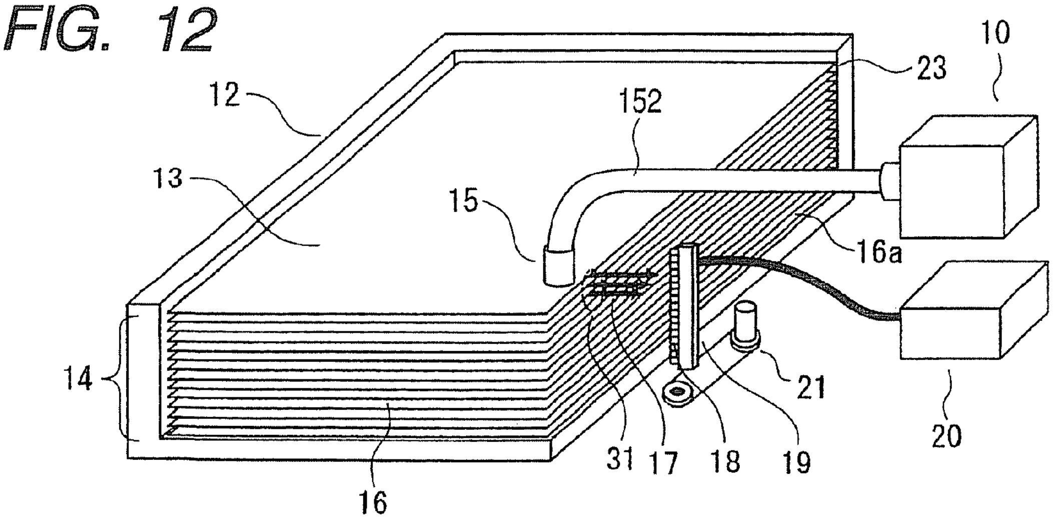
FIG. 12 is a view of a configuration of a sheet thickness measuring device according to a fourth embodiment of the invention.

FIG. 12 shows a configuration of a sheet thickness measuring device according to a fourth embodiment of the invention.

In the embodiment shown in FIG. 12, a light source 10 of the sheet thickness measuring device includes a halogen lamp and a light guide 152 made of optical glass fiber. An illumination light 11, which is output from the radiation surface of the light guide, is illuminated toward the top face of the sheet stack 14 which is put on the tray 12 and is made of a plurality of sheets 13 stacked on top of one another. The illuminated position of the light source 10 is set 1 mm inside the sheet 13 from the edge of the top face of the sheet stack 14. And, a light shielding member 15 is a metal tube which is used to shield the periphery of the circular-shaped optical fiber for guiding the light issued from the halogen lamp. Since the light shielding member 15 is lightly pressed against the sheet stack 14, a part of the illumination light 11 illuminated onto the top face of the sheet stack 14 is reflected by the surface of the sheet 13 but is shielded by the light shielding member 15, so that it is prevented from arriving at the light receiving element 19. Other part of the illumination light 11 permeates the inside of the sheet stack 14, is diffusedly propagated through the gaps 23 between the respective sheets constituting the sheet stack 14, and arrives at the side face 16*a* of the sheet stack 14.

The light receiving element 19 is a line sensor. The light receiving element 19 is provided with an imaging lens 18 that is configured by a refraction index distribution type lens and measures the propagated light 17 output from the second area 31 on the side face 16*a* of the sheet stack 14 at a size substantially the same with the size of the light receiving element of the sensor. Accordingly, the propagated light 17 output from the side face 16*a* of the sheet stack 14 can be captured with high resolution by a simple optical system. The actuator unit 21 moves the light receiving element 19 of the line sensor arranged in a stacking direction of the sheet stack 14 into a horizontal direction of the sheet stack 14 by a mechanism such as a motor and a belt.

The light receiving element 19 can be moved in the horizontal direction of the sheet stack 14 using the actuator unit 21, thereby being able to obtain the image data in a wide area with a small number of pixels. In addition, the light receiving element 19 can measure the propagated light 17 output from the second area 31 on the side face 16*a* of the sheet stack 14 at a wide area with high resolution of the line sensor.

The light receiving element 19 outputs the image data to a calculation unit 20. The calculation unit 20 extracts intervals between peaks of the light amount in the sheet stacking direction, and integrates the thus obtained results to determine the peak interval, thereby obtaining information regarding the sheet thickness based on the peak interval.

Next, description will be given below of the advantages of the above-mentioned fourth embodiment of the invention. The light source 10 uses a halogen lamp the illumination light amount of which can be adjusted, while the illumination light 11 from the halogen lamp is extended up to the illuminated position by the light guide 152 using optical fiber. The illumination portion of the light guide 152 is covered with a metal-made cylindrical case and, when the illumination portion of the light guide 152 is pressed against the sheet stack 14, the illumination light 11 is allowed to permeate the arbitrary portion of the inside of the sheet stack 14 without leakage.

In the embodiment, it is assumed that a halogen lamp is used as the light source 10. However, other illumination source may be used as the light source 10. For example, as the light source 10, there can also be used other types of lamps such as a metal halide lamp. The illumination light 11 is not limited to the white light but, for example, the halogen lamp may be combined with a band-pass filter to thereby radiate blue light, green light, red light, or near infrared light.

Although the shape of the radiation surface of the light guide 152 is set circular, for example, even the line-shaped radiation surface may also be a semi-circular-shaped radiation surface. At any rate, the radiation surface may have any shape, provided that it allows the light shielding member 15 to shield the light from entering the periphery of the optical fiber.

In the fourth embodiment shown in FIG. 12, the light source 10 radiates the top face of the sheet stack 14. However, the light source 10 may also radiate the lower face of the sheet stack 14, or may radiate any one or more of the side faces 16 of the sheet stack 14.

Although the position of the sensor is changed in the horizontal direction by the actuator unit 21, this is not limitative but, on the other hand, the sheet stack 14 may be moved to thereby obtain equivalent results to the above-mentioned embodiment.

Figure 13:
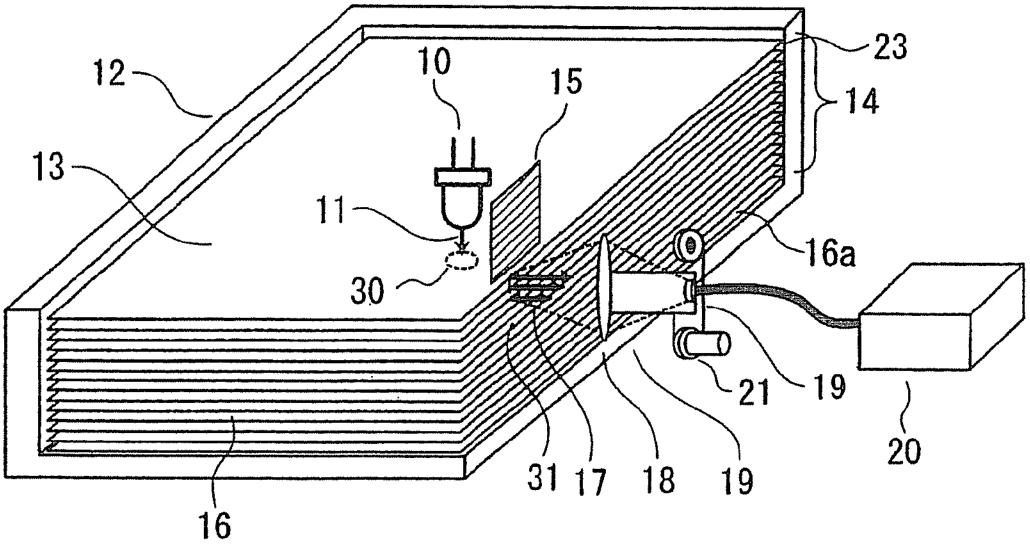
FIG. 13 is a view of another configuration of a sheet thickness measuring device according to the fourth embodiment of the invention.

FIG. 13 shows another configuration of the sheet thickness measuring device according to the fourth embodiment of the invention. In FIG. 13, the parts thereof corresponding to those shown in FIG. 1 are given the same symbols and thus the redundant description thereof is omitted herein.

According to the configuration shown in FIG. 13, a photo diode having an image forming lens 18, which focuses on a point on the side faces 16*a* of the sheet stack 14, may be moved in the sheet stacking direction using a actuator unit 21 composed of a motor, a belt and the like. Therefore, according to the present configuration, the propagated light 17 can be detected with a more simplified configuration.

Although the present embodiment is configured to move the light receiving element 19 by the actuator unit 21 in the horizontal direction or in the vertical direction, the light receiving element 19 may be moved to change the distance to the side face 16*a*. According to this configuration, the light receiving element 19 can correctly focus the imaging lens 18 onto the side face 16*a*.

Fifth Embodiment

Figure 14:
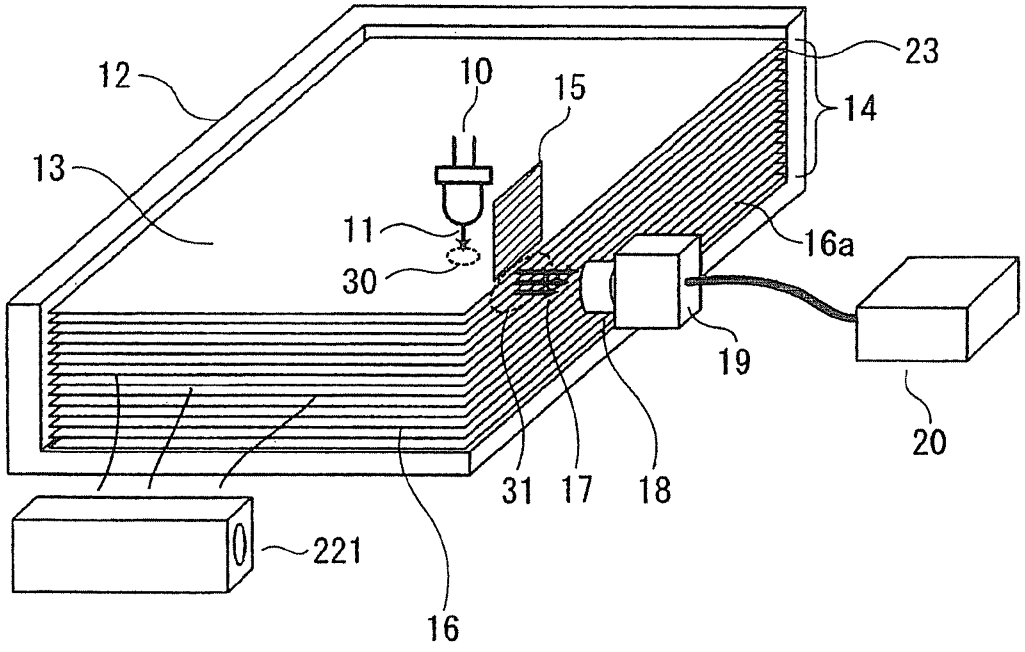
FIG. 14 is a view of a configuration of a sheet thickness measuring device according to a fifth embodiment of the invention.
Figure 15:
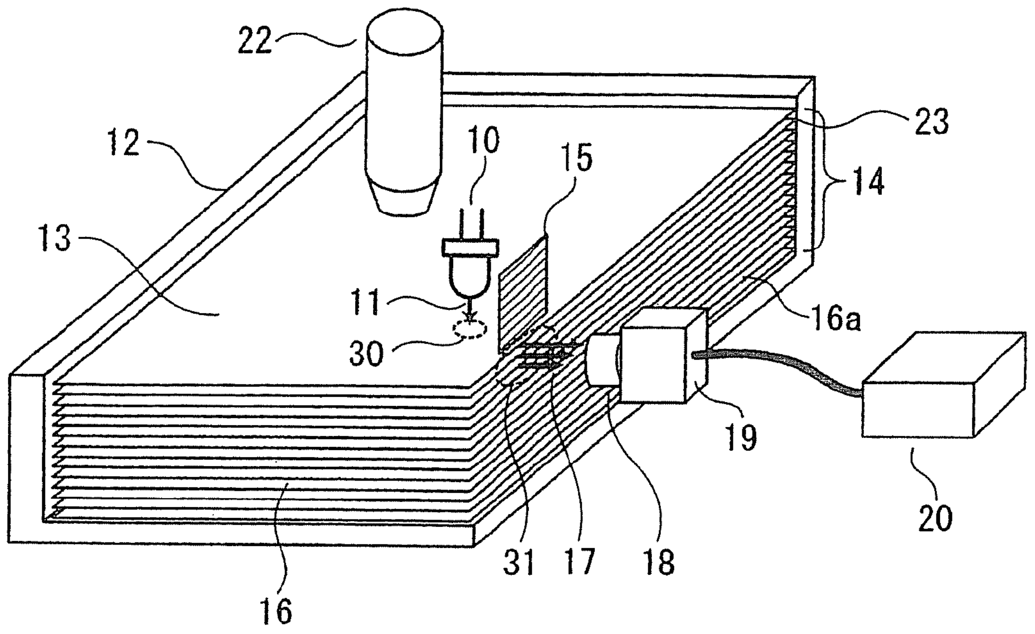
FIG. 15 is a view of another configuration of a sheet thickness measuring device according to the fifth embodiment of the invention.

Next, description will be given below of a fifth embodiment according to the invention with reference to FIGS. 14-16. In FIGS. 14 and 15, the parts thereof corresponding to those shown in FIG. 1 are given the same symbols and thus the redundant description thereof is omitted herein.

FIG. 14 shows a configuration of a sheet thickness measuring device according to the fifth embodiment of the invention. In FIG. 14, a tray 12 includes a blow and separate mechanism 221 serving as sheet separating means which applies air to any one of a plurality of side faces of the sheet stack 14 to blow the air between the respective sheets 13 to thereby separate the closely contacted sheets 13 from each other.

Next, description will be given below of the advantages of the fifth embodiment of the invention. The piled-up sheets 13 can stick tight to each other for some reasons. For example, because burrs produced when cutting the sheets 13 twist each other, or because the sheets 13 are held in the mutually closely contacted state for a long time, the mutually adjoining sheets 13 can stick to each other. When the sheets 13 sticks tight to each other, there are eliminated the gaps 23 between the respective sheets 13 which are necessary to obtain information on the thickness of the sheet 13, which can make it impossible to obtain a sufficient quantity of propagated light 17 necessary to measure the thickness of the sheet 13. The air blown by the blow and separate mechanism 221 is applied to the side face 16 of the sheet stack 14, whereby the air is blown into the gaps 23 between the sheets 13. Due to the blown-in air, the closely contacted sheets 13 can be separated from each other, thereby producing the gaps 23 in the respective sheets 13. When there are produced the gaps 23, the light passing through the inside of the sheet stack 14 is easy to arrive at the side face 16*a*, which can facilitate the detection of the thickness of the sheet 13.

FIG. 15 shows another configuration of the sheet thickness measuring device according to the fifth embodiment of the invention. The configuration shown in FIG. 15 includes, as a sheet separate mechanism, a supersonic oscillation mechanism 22 which presses an oscillator against the top face of the sheet stack 14 and applies supersonic waves to the sheet stack 14 to thereby produce the gaps 23 between the respective sheets 13. The supersonic oscillation mechanism 22 vibrates the sheets 13, to thereby separate each sheets 13 that are attached with one another. When the gap 23 is formed between the sheets 13, the light propagating inside the sheet stack 14 becomes easier to reach the side face 16*a*, whereby detection of the thickness of the sheets becomes easier.

Figure 16:
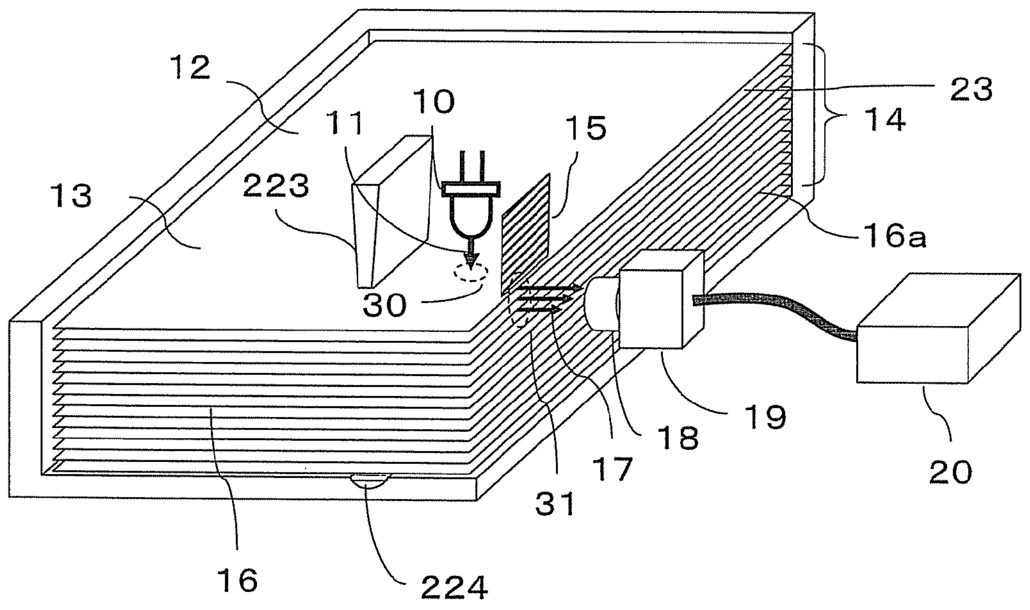
FIG. 16 is a view of a still another configuration of a sheet thickness measuring device according to the fifth embodiment of the invention.

FIG. 16 shows another configuration of the sheet thickness measuring device according to the fifth embodiment of the invention. In the configuration shown in FIG. 16, there is provided a pallet 223 that serves as the sheet separate mechanism, which is pressed toward the top face of the sheet stack 14 to form the gap 23 between the sheets 13. The pallet 223 is formed to have a shape that becomes thinner toward a rounded leading end. The tray 12 may be formed to have a groove 224 on the face that abuts the bottom face of the sheet stack 14. The groove 14 is formed at a position where the pallet 223 is pressed. By pressing the pallet 223 onto the sheet stack 14 toward the grove 224, the edge of the sheet stack 14 is warped upward and the gap 23 is formed between the sheets 13. When the gap 23 is formed between the sheets 13, the light propagating inside the sheet stack 14 becomes easier to reach the side face 16*a*, whereby detection of the thickness of the sheets becomes easier.

Although not shown in FIG. 15, the sheet 13 or sheet stack 14 may be moved using a mechanism for delivering the sheet 13 to separate the respective sheets 13, thereby producing the gaps 23 between the respective sheets.

Sixth Embodiment

A sixth embodiment of the invention will be described with reference to FIG. 17

Figure 17:
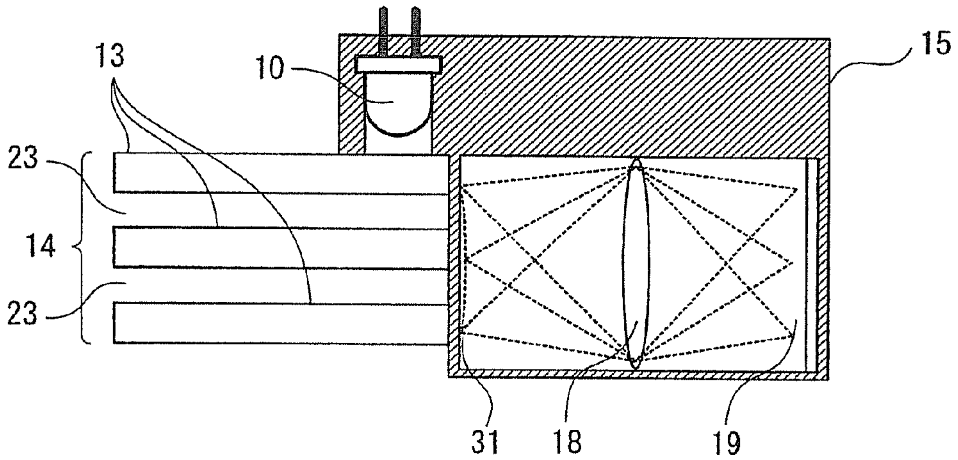
FIG. 17 is a view of a configuration of a sheet thickness measuring device according to a sixth embodiment of the invention.

FIG. 17 shows a configuration of a sheet thickness measuring device according to the sixth embodiment of the invention.

In the embodiment shown in FIG. 17, a light source 10, a light shielding member 15 and a light receiving element 19 are structured as a unit. A illumination light 11, which is issued from the light source 10, is applied toward the top face of the sheet stack 14 which is put on the tray 12 and is made of a plurality of sheets 13 stacked on top of one another. The light shielding member 15 is unified with the light source 10 and light receiving element 19, has a shape to cover the peripheries of the respective light source 10 and light receiving element 19, and limits the radiation area of the light source 10 in order to prevent the illumination light 11 from entering the light receiving element 19. The illumination light 11, which is illuminated onto the top face of the sheet stack 14, permeates the inside of the sheet stack 14, is diffusedly propagated through the gaps 23 between the respective sheets 13 constituting the sheet stack 14, and arrives at the side face 16*a* of the sheet stack 14. The propagated light 17 is gathered from the second area 31 existing in the side face 16*a* of the sheet stack 14 into the light receiving element 19 through an image forming lens 18 which is disposed so as to face the side face 16*a*.

Image data of the propagated light 17, which is obtained by the light receiving element 19, are converted to light amount distribution information by a calculation unit 20 by performing a processing for obtaining the thickness of the sheets 13, and the calculation unit 20 outputs the information on the sheet thickness.

Next, description will be given below of the advantages of the sixth embodiment of the invention. In the sixth embodiment, the light source 10, light shielding member 15 and light receiving element 19 are structured as single unit. The light source 10 is disposed at a position 1 mm from the end of the sheet 13. As the light receiving element 19, there is used an area sensor which has a refraction index distribution type lens; and, a frame, which is used to hold them and shield them from the light, is made of resin. When the unit composed of these parts is pressed against the sheet 13, the propagated light 17, which is diffusedly propagated through the inside of the sheet 13 and is arrived at the side faces 16*a* of the sheet 13, can be measured while controlling the influence of noise caused by the external light. Also, when pressing the unit against the sheet stack 14, the unit can moved by single moving means (not shown), thereby being able to provide the advantages of the invention with a simple configuration.

The light source 10 may be configured as a unit having multiple light sources that are respectively disposed to face the lower face and the side faces of the sheet stack 14. The light source 10 may be configured by light emitting devices other than LEDs.

Seventh Embodiment

A seventh embodiment of the present invention will be described with reference to FIG. 18.

Figure 18:
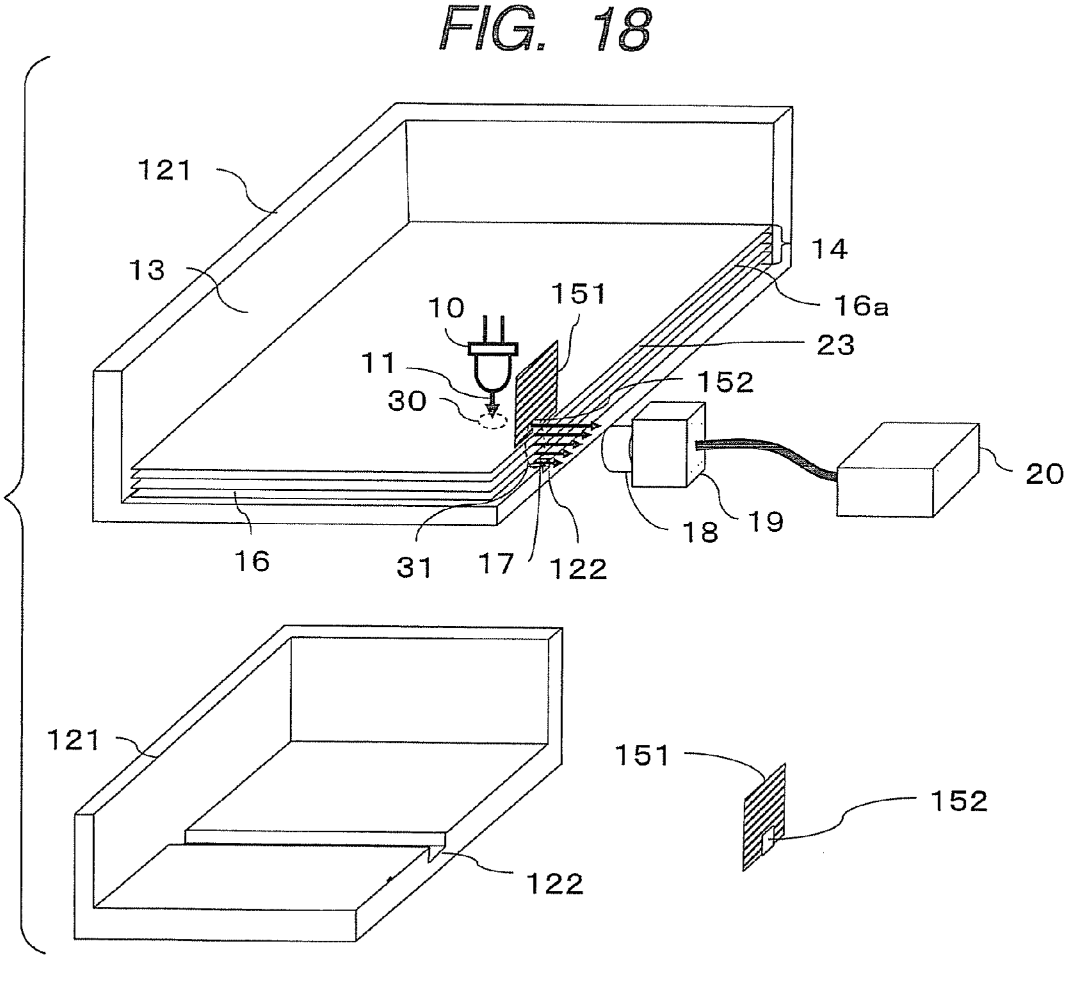
FIG. 18 is a view of a configuration of a sheet thickness measuring device according to a seventh embodiment of the invention.

An example of a sheet thickness measuring device according to the seventh embodiment is shown in the upper section of FIG. 18. The tray 121 and the light shielding ember 151 of the device are shown in the lower section of FIG. 18.

The tray 121 according to the seventh embodiment is provided with a groove 122 on a bottom face where the bottom face of the sheet stack 14 is placed on. The light shielding member 151 is provided with a slit 152 at an edge where abuts the top face of the sheet stack 14.

The illumination light 11 emit by the light source 10 is illuminated on the top face of the sheet stack 14. Most of the illumination light 11 emit by the light source 10 are shielded by the light shielding member 151, however, a part of the illumination light 11 passes through the slit 152 and enters the light receiving element 19. A part of the light, which propagated inside the sheet stack 14 and reached the bottom face of the sheet stack 14, passes through the groove 122 and enters the light receiving member 19. Accordingly, the light receiving member 19 is configured to receive the light that is used as a reference that indicates a position of the top face and a position of the bottom face of the sheet stack 14. The calculation unit 20 measures the thickness of the sheets 13 and the number of the sheets 13 based on the reference light and the propagated light 17 that is output from the gap 23 of the sheets 13.

When the number of sheets 13 is small, the number of peaks of the propagated light 17 that is output from the gap 23 between the sheets 13 becomes small. Therefore, by forming an appropriate gap, such as grooves and slits, on the light shielding member 151 and the bottom face of the tray 121, the reference light that indicates the positions of the top face and the bottom face of the sheet stack 14 can be obtained. According to the reference light, the number of peaks can be increased, and the thickness of the sheets 13 can be measured even in a case where the number of sheets 13 is small.

For example, in a case where the number of the sheets 13 is one, the light receiving member 19 can obtain the light amount distribution information that has two peaks by the reference lights output from the slit 152 and the groove 122. Accordingly, the calculation unit 20 can obtain the thickness of the sheets 13 based on the two peaks.

The groove 122 and the slit 152 may be formed in a distinguishing shape for distinguishing the reference light output from the groove 122 and the slit 152 and the propagated light 17 that is output the second area 31 on the side face 16*a* of the sheet stack 14. The reference light and the propagated light 17 can be easily distinguished by use of a pattern of the light amount distribution of the reference light, which is stored in the sheet information database 209.

The gaps that is provided on the light shielding member 15 and the bottom face of the tray 12 are not limited to be formed by a groove, but may be formed by roughening the surfaces thereof to obtain the same advantage.

Eighth Embodiment

An eighth embodiment according to the present invention will be described with reference to FIGS. 19-21. The eighth embodiment is configured to measure the light amount distribution of the propagated light 17 while being not affected by an error caused by a stacked state of the sheets 13 in the sheet stack 14.

Figure 19:
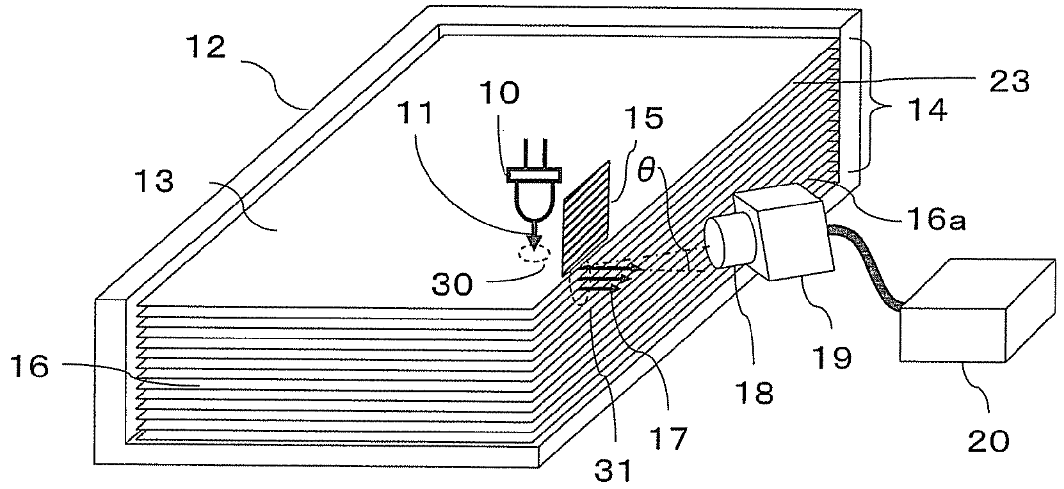
FIG. 19 is a view of a configuration of a sheet thickness measuring device according to an eighth embodiment of the invention.

FIG. 19 shows a configuration of a sheet thickness measuring device according to the eighth embodiment. The light receiving element 19 is an area sensor, such as CCD image sensor and CMOS sensor, having a plurality of elements that are two-dimensionally arranged. The image forming lens 18 and the light receiving element 19 are disposed to capture an image of the side face 16*a* from a direction having an angle θ from a normal line of the side face 16*a*. The calculation unit 20 calculates the thickness of the sheets 13 based on the light amount distribution information obtained in the sheet stacking direction in which the contrast of the image of the image data becomes maximum.

Figure 20:
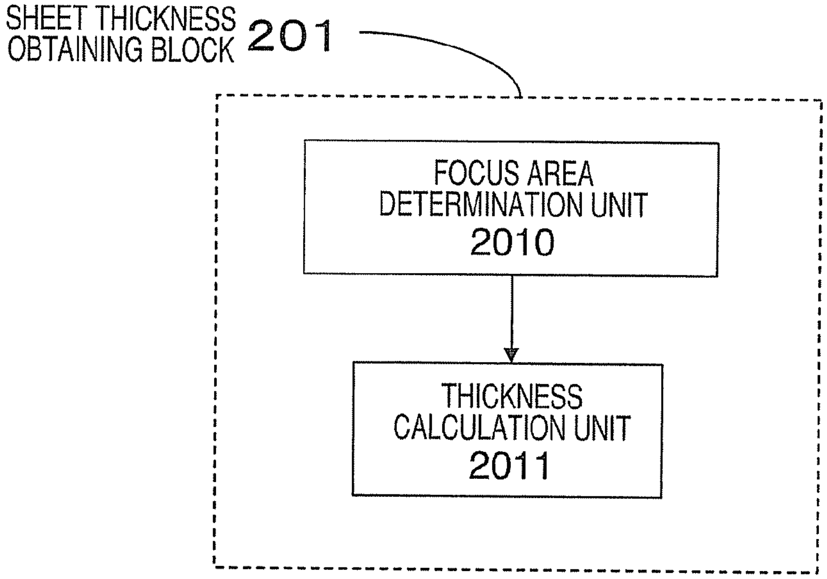
FIG. 20 is a view of a configuration of a sheet thickness obtaining block provided in the sheet thickness measuring device according to the eighth embodiment of the invention.

FIG. 20 shows a configuration of the sheet thickness obtaining block 201. The sheet thickness obtaining block 201 according to the eighth embodiment is provided with a focus area determination unit 2010 and a thickness calculation unit 2011.

The focus area determination unit 2010 determines, based on the two-dimensional image data captured by the light detection block 200, a focus area that is an area in the sheet stacking direction where assumed that the focus of the imaging lens 18 is most focused. The thickness calculation unit 2011 calculates the thickness of the sheets 13 based on the image data of the focus area.

Figure 21:
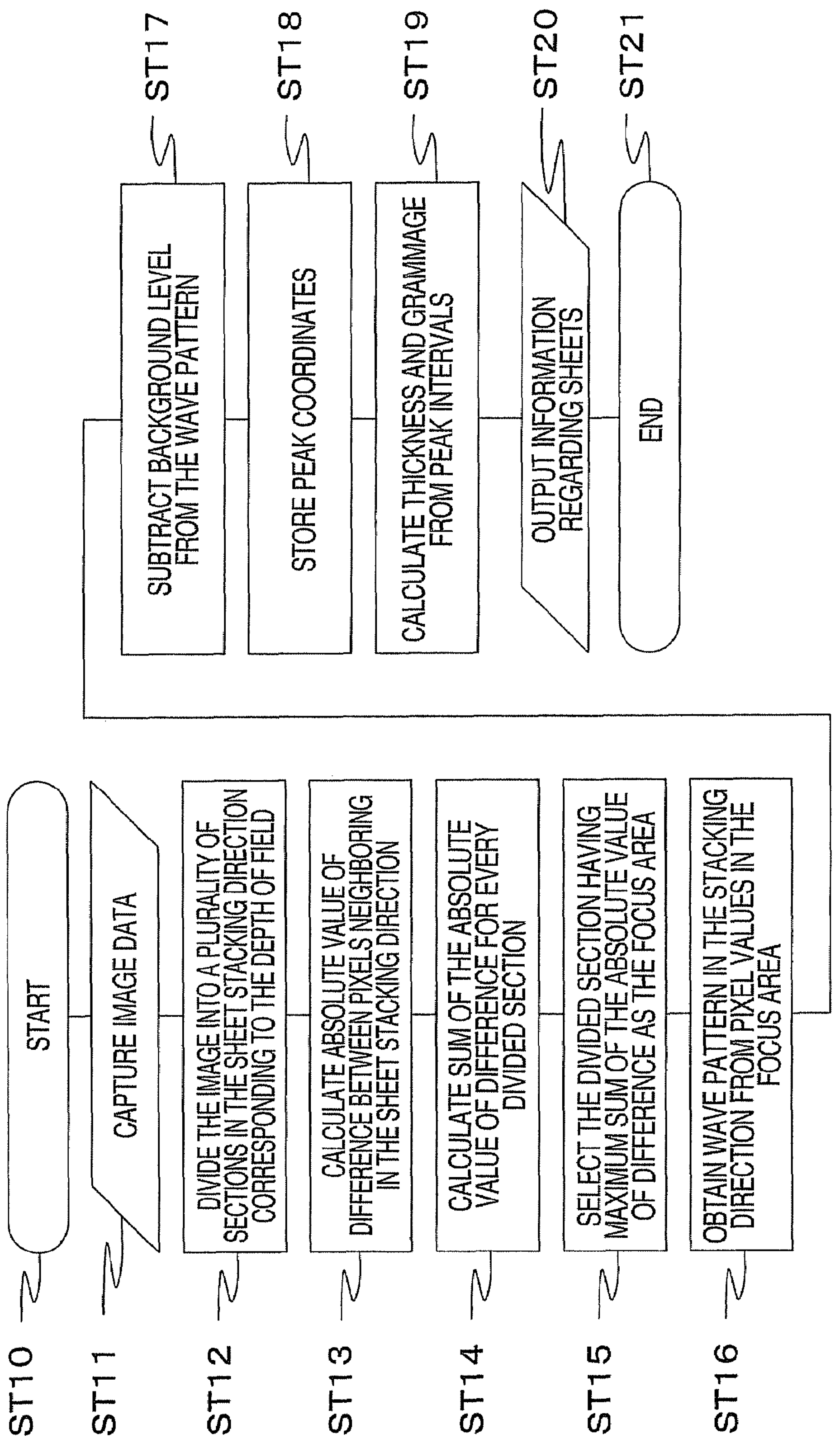
FIG. 21 is a flowchart of a process performed by the sheet thickness measuring device according to the eighth embodiment of the invention.

FIG. 21 is a flowchart that shows a process for calculating the thickness and the grammage of the sheets 13 by the sheet thickness measuring device according to the eighth embodiment.

The illumination light 11 emit from the light source 10 is input inside the sheet stack 14 and propagates inside the sheet stack 14 to be output as the propagated light 17 from the second area 31 on the side face 16*a*. The light amount distribution of the propagated light 17 is captured by the imaging lens 18 and the light receiving element 19 that are disposed to be in non-parallel with the side face 16 of the sheet stack, whereby the image data is captured (ST11). The focus area determination unit 2010 divides the image data into a plurality of sections (ST12), each corresponding to 0.2 mm width in a case where the depth of field of the camera (the imaging lens 18 and the light receiving element 19) is 0.2 mm. The absolute value of the difference between pixels that are neighboring in the sheet stacking direction is calculated for every pixel in the image (ST13). The sum of the absolute value of the difference is calculated for every divided section (ST14), and the section having maximum value as the focus area is selected (ST15) The thickness calculation unit 2011 sums the pixel values in the focus area in a lateral direction (ST16), subtracts a local background level, which is assumed based on the wave pattern in the longitudinal direction, from the summed value (ST17), stores coordinates of points having peak likelihood based on the wave pattern that is subtracted with the background level (ST18), obtains peak intervals from the coordinates, estimates the thickness from the resolution of the camera and the peak intervals, and calculates the grammage of the sheets 13 (ST19) based on the density of regular sheets, which is 0.75-0.85 g/cm$^3$. The thickness calculation unit 2011 outputs thus calculated parameters, such as thickness and the grammage of the sheets 13, to the parameter selecting block 208 (ST20) and ends the process (ST21).

In the process described above, the captured image is divided into a plurality of sections in the lateral direction (ST12) to cope with misalignment of the sheets 13 in the sheet stack 14. However, the captured image may be divided into a plurality of sections in the lateral direction and in the longitudinal direction.

The advantages obtained by the configuration according to the eighth embodiment will be described. The sheet stack 14 may not always be placed to have a constant distance from the light receiving element 19, and error may be caused in accordance with the stacked state. In addition, the side face 16 of the sheet stack 14 may not always be aligned to be in parallel with the vertical direction (longitudinal direction), and the sheets 13 may be misaligned in the sheet stack 14. However, the sheet thickness measuring device according to the eighth embodiment is configured that the imaging lens 18 and the light receiving element 19 are disposed to capture image of the side face 16*a* of the sheet stack 14 in a slanted direction that is slanted from the normal line of the side face 16*a*, and the focus area tends to occur within the captured image. Accordingly, the camera system configured by the imaging lens 18 and the light receiving element 19 has a deep depth of field.

In the above description, the focus area in the image is detected by obtaining a high frequency component. However, the focus area may be selected based on the distance between the sheet stack 14 and the light receiving element 19 disposed to be in non-parallel with the sheet stack 14 by detecting the position of the sheet stack 14 with a ranging device such as a micrometer.

Ninth Embodiment

A ninth embodiment according to the present invention will be described with reference to FIG. 22.

Figure 22:
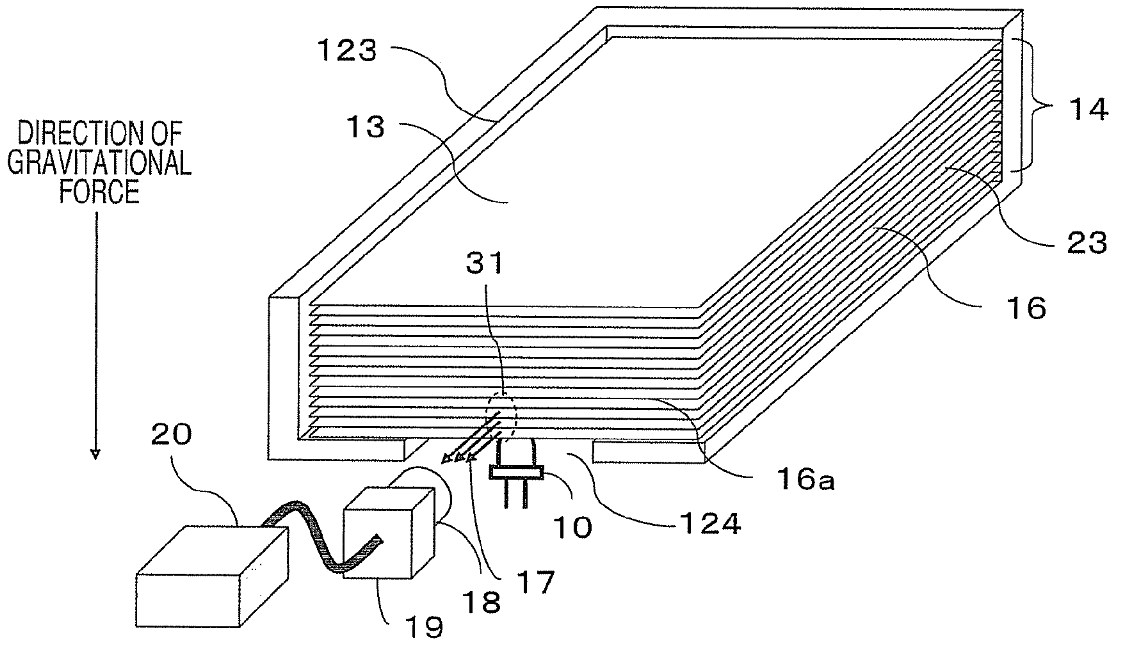
FIG. 22 is a view of a configuration of a sheet thickness measuring device according to a ninth embodiment of the invention.

FIG. 22 shows a configuration of a sheet thickness measuring device according to the ninth embodiment. The sheets 13 are stacked in the stacking direction that is in parallel with a direction of gravitational force. The light source 10 emits the illumination light 11 toward the bottom face of the sheet stack 14. A tray 123 is provided with an opening 123 on the bottom face thereof. Due to the opening 123, the sheet stack 14 sags downward by its own weight, and a gap 23 is formed between the sheets 13.

The advantages obtained by the configuration according to the ninth embodiment will be described. The tray 123 is formed with the opening 124 on the bottom face thereof, and the sheet stack 14 placed on the tray 123 sags downward at the opening 124.

The amount of the sag occurring at the opening 124 by its own weight is physically limited by the light source 10. Accordingly, the gap 23 formed by the sag is appropriately formed for detecting the propagated light 17 output from the gap 23. The tray 123 may be provided with a groove having sufficient depth for causing the sag and forming the gap 23 in place of the opening 124.

Tenth Embodiment

A tenth embodiment according to the present invention will be described with reference to FIG. 23.

Figure 23:
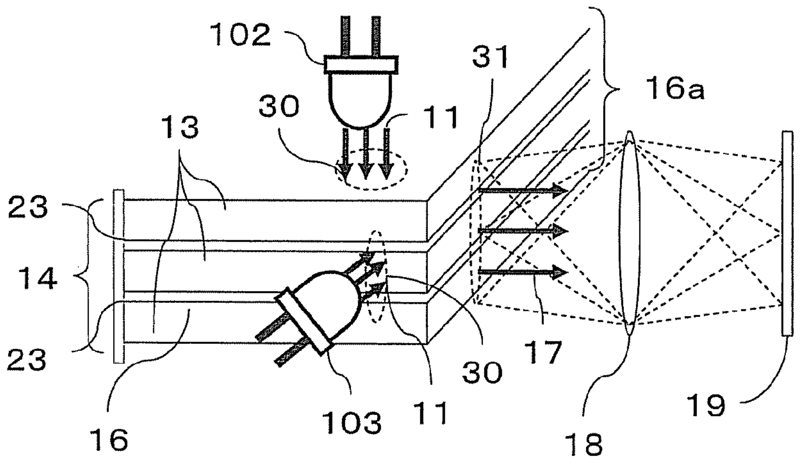
FIG. 23 is a view of a configuration of a sheet thickness measuring device according to a tenth embodiment of the invention.

FIG. 23 shows positions of light sources in a sheet thickness measuring device according to the tenth embodiment.

The sheet thickness measuring device according to the tenth embodiment is provided with two LEDs 102 and 103. The LED 102 emits illumination light toward the top face of the sheet stack 14. The LED 103 emits illumination light toward a side face 16 of the sheet stack 14, which is different from the side face 16*a* where the light receiving element 19 faces and captures image. The light receiving element 19 captures the propagated light 17, which is a part of the illumination lights emit from the LEDs 102 and 103 and being propagated between the gap 23 to be output from the side face 16*a*. In FIG. 23, a light shielding member that shields light that is directly input from the light sources to the light receiving element 19 is omitted.

In the sheet thickness measuring device according to the tenth embodiment, the sheet stack 14 is illuminated at the top face and the side face by the LEDs 102 and 103 simultaneously or alternately. Accordingly, the light receiving element 19 can capture image of the propagated light 17 for a wide range in the stacking direction and in the lateral direction of the sheet stack 14.

The wavelengths of the illumination lights emit by the LEDs 102 and 103 may be configured to be the same or may be different from each other. By utilizing two LEDs 102 and 103 that emit illumination lights having different wavelength, the light receiving element 19 can obtain the propagated light 17 for a wider range.

As described above, various changes and modifications are possible. Here, these changes and modifications fall under the scope of the present invention without departing from the subject matter of the invention.

It is to be understood that the invention is not limited to the specific embodiment described above and that the present invention can be embodied with the components modified without departing from the spirit and scope of the present invention. The present invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A sheet thickness measuring device comprising:

an illumination unit that outputs a light that is illuminated into a stack of sheets from a first area defined on one of faces including a top face, a bottom face, and side faces of the stack of sheets;

a detection unit that detects a light amount distribution of light entered into the stack of sheets and propagated to a second area through the stack of sheets, the second area defined on one of the side faces of the stack of sheets; and a calculation unit that calculates a thickness of a sheet in the stack of sheets based on the light amount distribution detected by the detection unit.

2. The device according to claim 1, wherein the illumination unit and the detection unit are disposed to face different faces of the stack of sheets.

3. The device according to claim 2, wherein the illumination unit illuminates the light toward at least one of the top face and the bottom face of the sheet stack.

4. The device according to claim 3 further comprising a light shielding unit that shields light that directly enters the detection unit from the illumination unit.

5. The device according to claim 4 further comprising an adjustment unit that adjusts light amount of the light illuminated by the illumination unit.

6. The device according to claim 5, wherein the adjustment unit controls the illumination unit to output the light with a plurality of level of light amount, and the detection unit detects the light amount distribution for each level of the light amount.

7. The device according to claim 5, wherein the adjustment unit adjusts the light amount of the light illuminated by the illumination unit in accordance with the light amount distribution detected by the detection unit.

8. The device according to claim 5, wherein the detection unit is disposed to be in non-parallel with the side face of the stack of sheets.

9. The device according to claim 4, wherein the light shielding unit is provided with a first output unit that passes through a part of the light output from the illumination unit.

10. The device according to claim 4 further comprising a tray having a bottom face on which the bottom face of the stack of sheets is placed, wherein the tray is provided with, on the bottom face of the tray, a second output unit that passes through a part of the light that reached the bottom face of the stack of sheets.

11. The device according to claim 1 further comprising an actuator unit that changes relative position between the illumination unit and the detection unit in accordance with the light amount distribution detected by the detection unit.

12. The device according to claim 1, wherein the calculation unit extracts a peak position having a high brightness based on the light amount distribution obtained along a direction in which the sheets are stacked and calculates the thickness of the sheet based on the extracted peak position.

13. The device according to claim 1, wherein the illumination unit is provided with a plurality of light sources that are disposed to face different faces of the stack of sheets.

14. The device according to claim 1, wherein the illumination unit is provided with a plurality of light sources that respectively emit lights having center wavelengths different from one another.

15. The device according to claim 1, wherein the illumination unit is provided with a plurality of light sources that are disposed at positions having different distances from an edge of one of the top face and the bottom face of the stack of sheets.

16. The device according to claim 1, wherein the illumination unit is provided with a linear light source that is arranged to be in non-parallel with an edge of one of the top face and the bottom face of the stack of sheets.

17. The device according to claim 1 further comprising an actuator unit that changes relative position between the illumination unit and the detection unit, wherein the detection unit detects the light amount distribution for each of different relative positions between the illumination unit and the detection unit.

18. The device according to claim 1 further comprising a sheet separation unit that separates the sheets in the stack of sheets to form a gap between the sheets.

19. The device according to claim 1, wherein the first area and the second area are defined on one of side faces of the stack of sheets, and wherein the device further comprises a light shielding unit that prevents the light illuminated by the illumination unit from reaching the detection unit without entering into the stack of sheets.

20. An image forming apparatus comprising:

the device according to claim 1;

an image forming section that forms an image on a sheet fed from the stack of sheets; and a control unit that controls the image forming section based on the thickness of the sheet calculated by the calculation unit of the device.

21. The apparatus according to claim 20, wherein the control unit is provided with a grammage calculation unit that calculates grammage of the sheet based on the thickness of the sheet, and wherein the control unit controls the image forming section based on the grammage calculated by the grammage calculation unit.

22. The apparatus according to claim 21 further comprising a determination unit that determines a type of the sheet based on the grammage calculated by the grammage calculation unit.

23. A sheet thickness measuring device comprising:

an illumination unit that outputs a light that is illuminated on one of faces of a stack of sheets having a top face, a bottom face, and side faces;

a detection unit that detects a light amount distribution of light reached to one of side faces of the stack of sheets, the side face being different from the face where the illumination unit illuminates the light; and a calculation unit that calculates a thickness of a sheet in the stack of sheets based on the light amount distribution detected by the detection unit.

24. A sheet thickness measuring device comprising:

an illumination unit that outputs a light that is illuminated on one of side faces of a stack of sheets having a top face, a bottom face, and the side faces;

a detection unit that detects a light amount distribution of light reached to the side face on which the illumination unit illuminates the light;

a light shield that prevents the light illuminated by the illumination unit from reaching the detection unit without entering into the stack of sheets; and a calculation unit that calculates a thickness of a sheet in the stack of sheets based on the light amount distribution detected by the detection unit.

* * * * *